United States Patent [19]
Campbell, Jr. et al.

[11] 3,711,767
[45] Jan. 16, 1973

[54] METHOD AND APPARATUS FOR EVALUATING THE INTEGRITY OF THE SHIELD CONNECTION IN A SPLICING SECTION JOINING THE ENDS OF ADJACENT INSULATED AND SHIELDED COMMUNICATION CABLES

[75] Inventors: Richard H. Campbell, Jr., Gilford; William B. Wilkens, Laconia, both of N.H.

[73] Assignee: Wilcom Products, Inc., Laconia, N.H.

[22] Filed: Oct. 30, 1970

[21] Appl. No.: 85,617

[52] U.S. Cl. ...................324/51, 324/52, 324/72.5
[51] Int. Cl. ......................G01r 31/04, G01r 31/08
[58] Field of Search .......324/51, 52, 61 P, 72.5, 149, 324/64

[56] References Cited

UNITED STATES PATENTS

| | | | |
|---|---|---|---|
| 1,745,419 | 2/1930 | Henneberger | 324/52 X |
| 2,476,317 | 7/1949 | Nelson et al. | 324/52 |
| 2,802,173 | 8/1957 | Nisle | 324/64 X |
| 3,068,409 | 12/1962 | Bigliano et al. | 324/72.5 X |
| 3,444,465 | 5/1969 | Teixeira | 324/72.5 |

*Primary Examiner*—Gerard R. Strecker
*Attorney*—Reuben T. Carlson

[57] ABSTRACT

This invention provides an effective method and apparatus for testing the continuity of the shielding in communication cables, such as telephone cables, and for locating sections thereof which are defective and require repairs; without puncturing or damaging the cable insulation. The apparatus system embraces two identical probes designed for convenient application to the opposite ends of the splicing section to be tested. Each probe embraces a pickup electrode and an electronic impedance converting circuit. Noise signals induced on the cable shield from an exterior source, are capacitively coupled, through the cable insulation, to the pickup electrode on each probe, and then processed through an ultra high unity gain impedance converting circuit in the probe head and into a low impedance signal. The output from the two probes are connected through a switch to the input transformer of a measuring set which also includes an attenuator and appropriate operational amplifiers. A bridge rectifier meter circuit with an appropriate damping capacitor provides the means for measuring the signal level.

17 Claims, 32 Drawing Figures

PATENTED JAN 16 1973 3,711,767

INVENTORS
RICHARD H. CAMPBELL, JR
WILLIAM B. WILKENS
BY Reuben I. Carlson
ATTORNEY

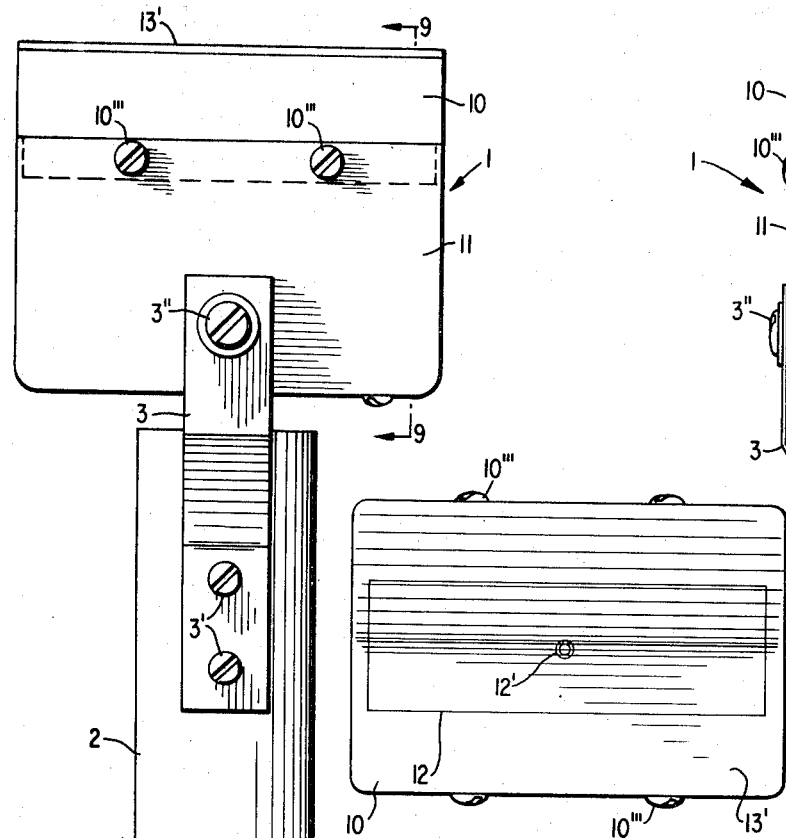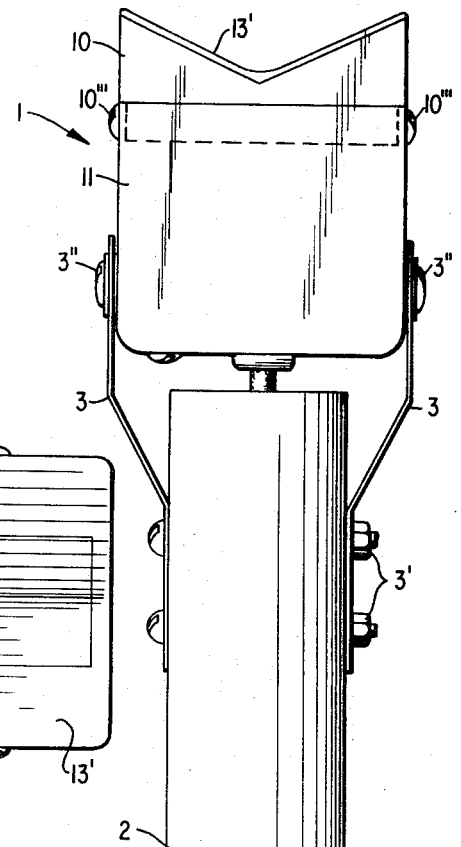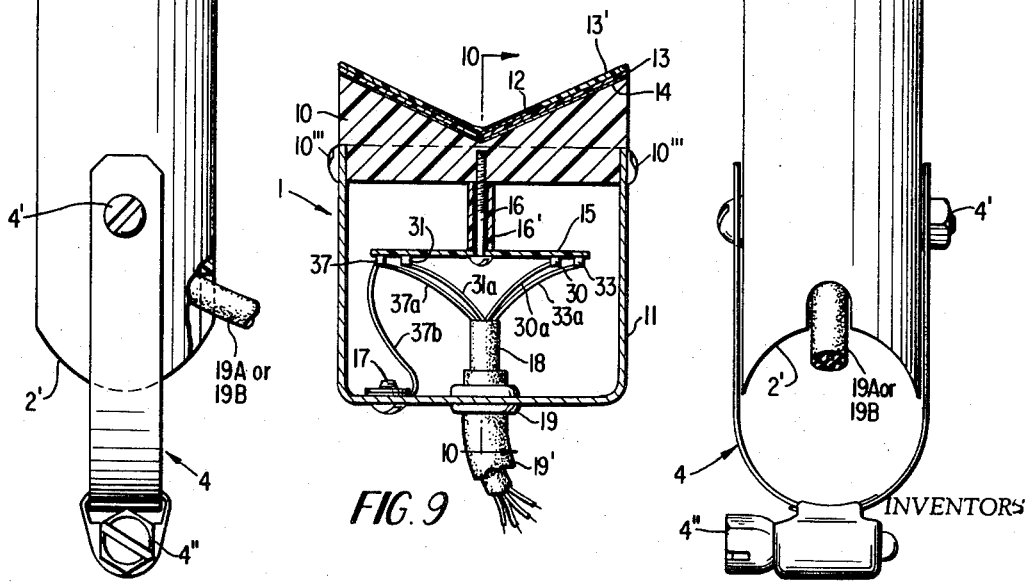

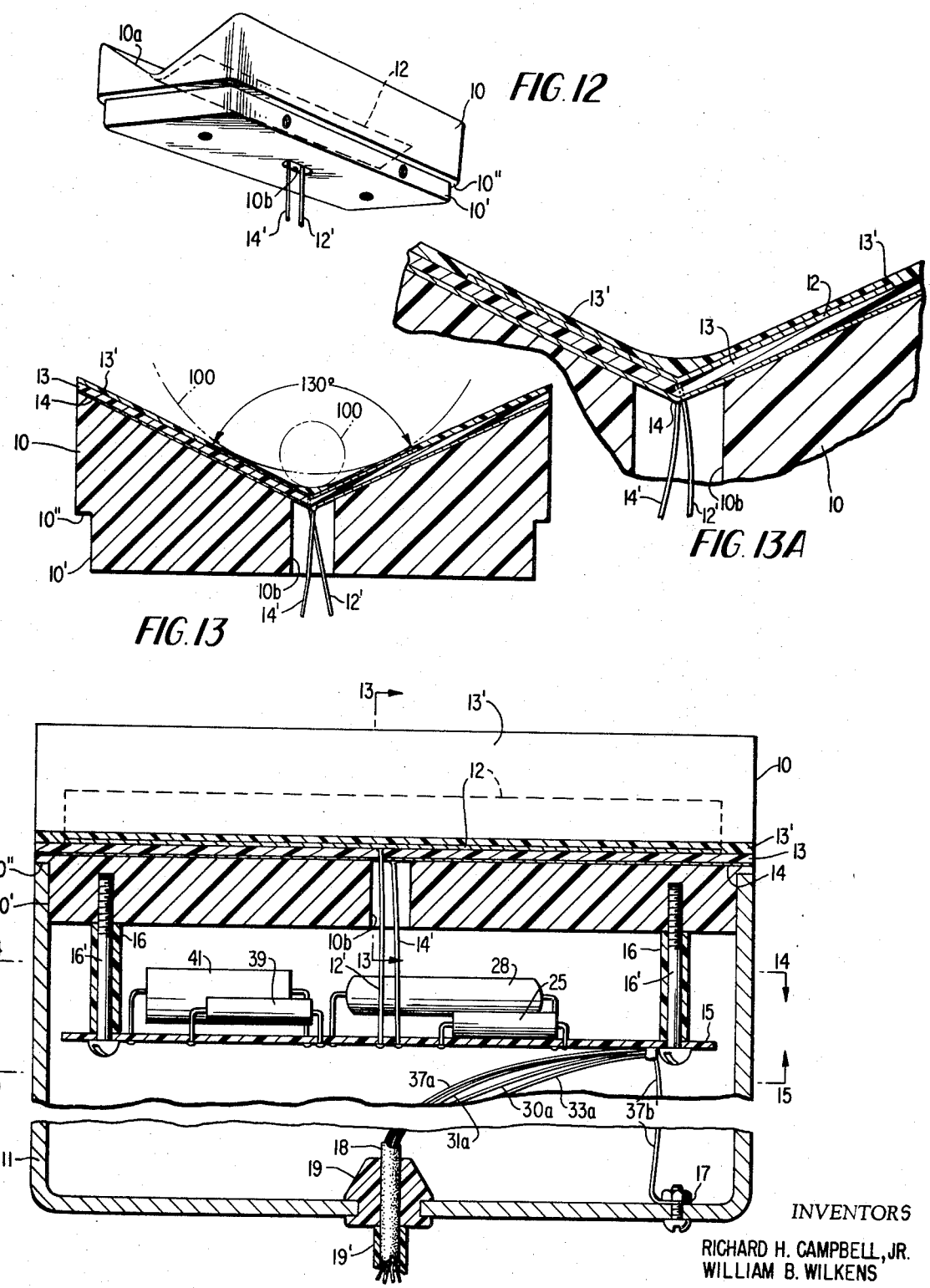

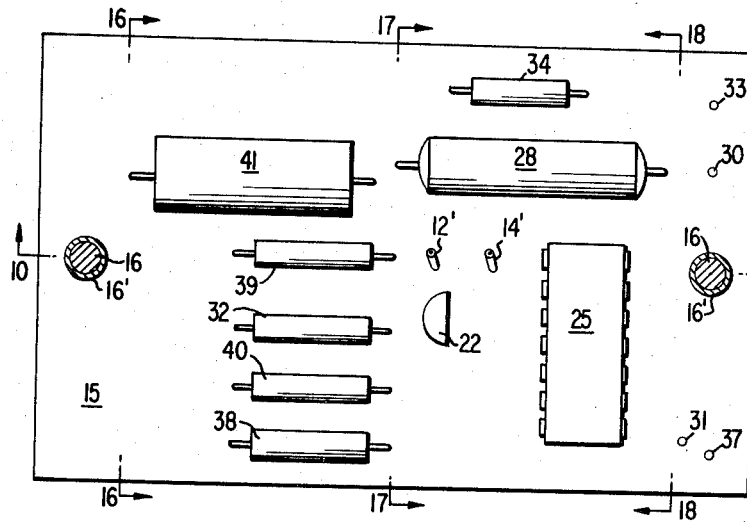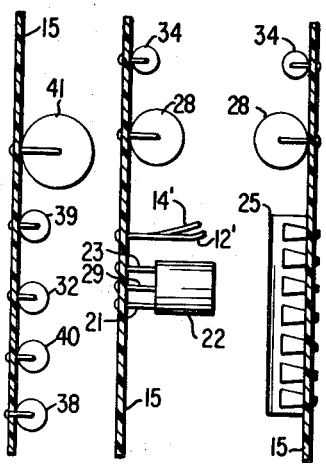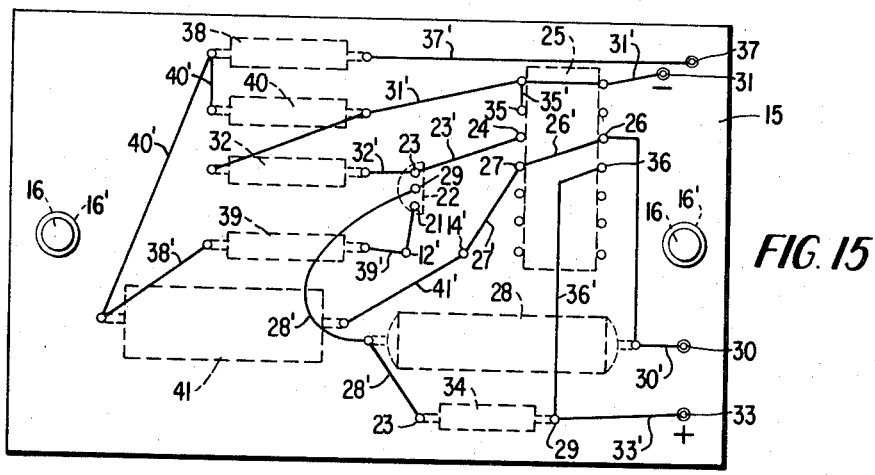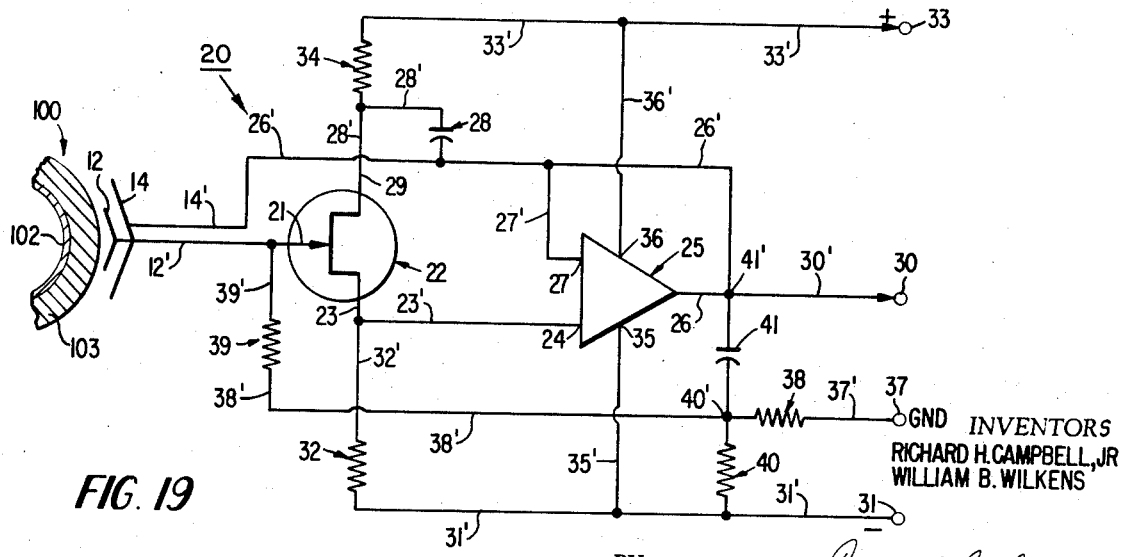

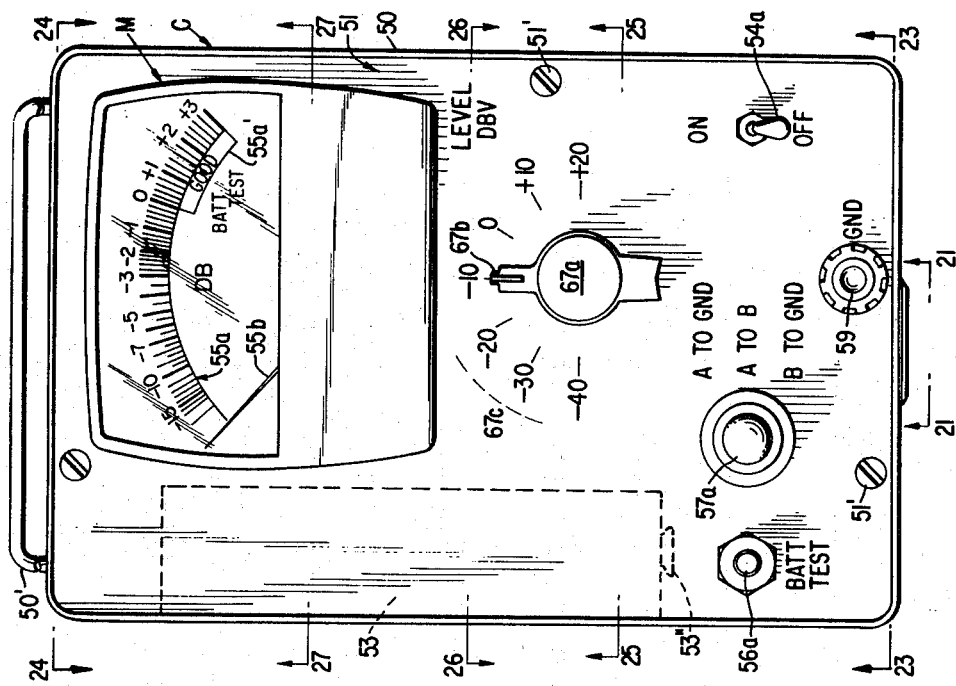
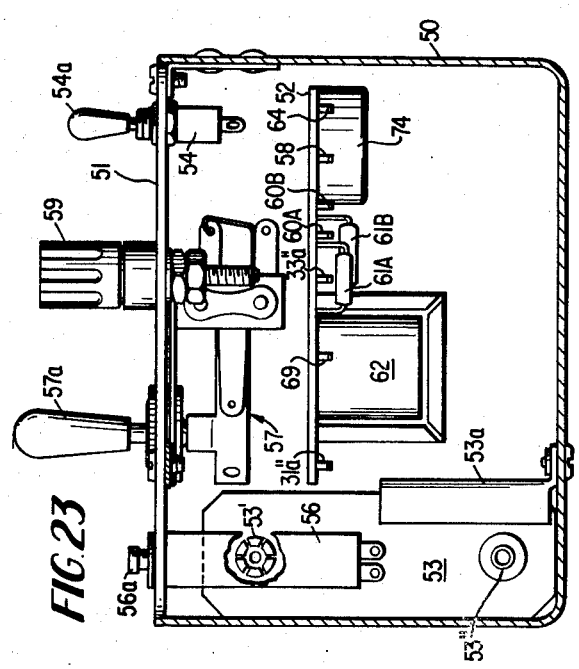
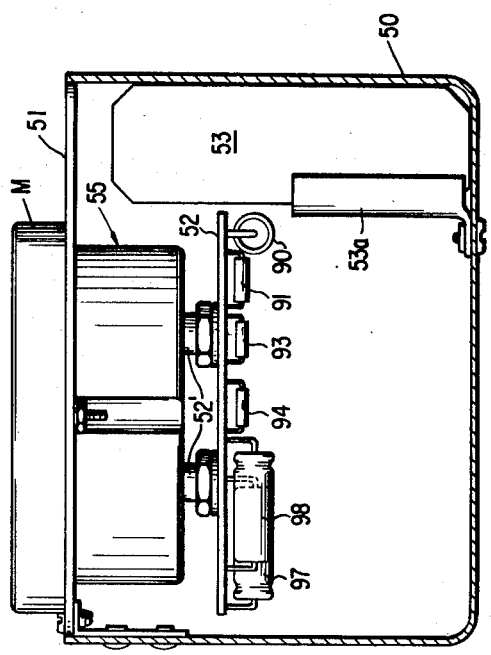
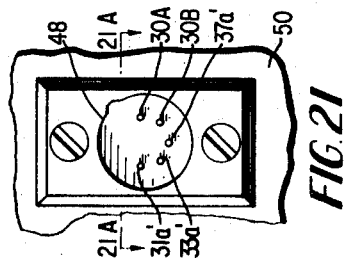
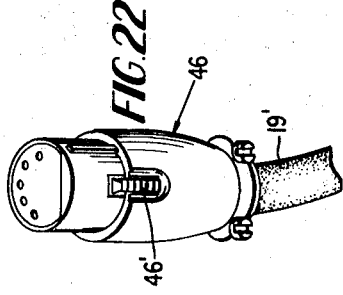
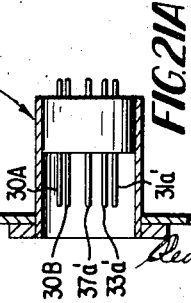
INVENTORS
RICHARD H. CAMPBELL, JR.
WILLIAM B. WILKENS
ATTORNEY

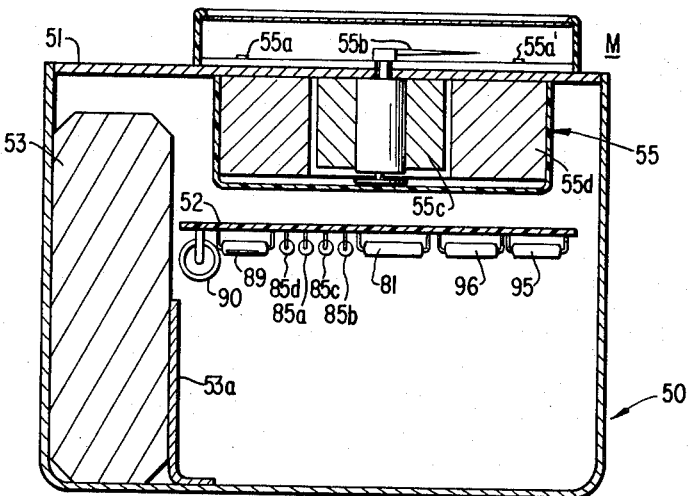
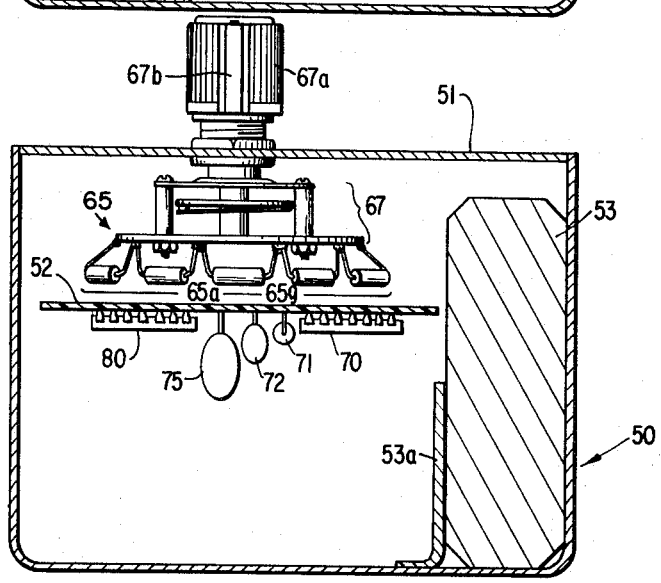
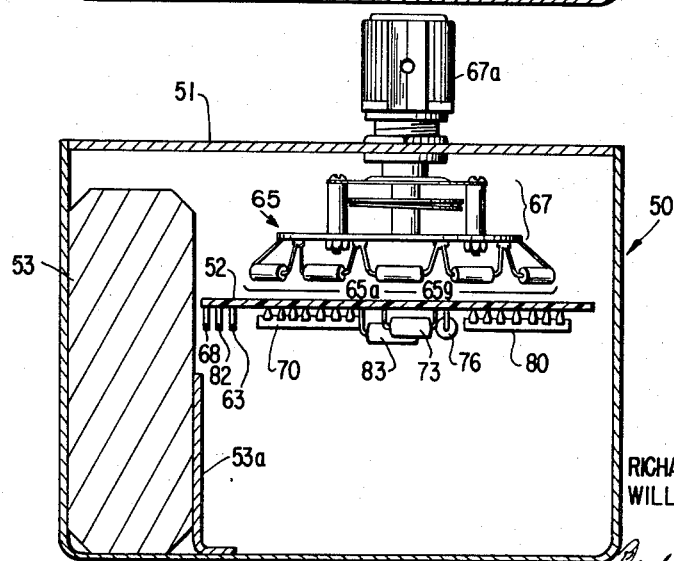

INVENTORS
RICHARD H. CAMPBELL, JR.
WILLIAM B. WILKENS

BY Reuben J. Carlson

ATTORNEY

METHOD AND APPARATUS FOR EVALUATING THE INTEGRITY OF THE SHIELD CONNECTION IN A SPLICING SECTION JOINING THE ENDS OF ADJACENT INSULATED AND SHIELDED COMMUNICATION CABLES

In practice, the two probes are pressed against a reference section of input end of the splicing, which is adjacent to the cable section whose integrity is to be determined, and a reading taken of the differential voltage between the probes across the reference section of cable. This voltage differential should be minimal if the reference section is in good condition. The two probes are then applied across the splicing section to be tested, and readings taken of the voltage differential between the right and left hand probes, between the left hand probe and ground, and between the right hand probe and ground. Provision is also made for switching the signal from the two probes so that either signal can be measured with respect to ground. Readings to ground provide the experienced technician with additional information about the nature of the discovered fault. Comparison of the voltage readings as thus made, will indicate to the technician whether the tested section of the insulated cable of shield splice is defective, and the nature of the defect.

THE PROBLEM

Some of the major contributing factors affecting the induction of noise in telephone circuits which are entirely in the cable, are defective bonding of cable shield splices and faulty bonding of cable shields to suitable grounds. In practice, the assembly and environmental limitations of bonding techniques used in the past have resulted in a serious accumulation of defective bonds with a consequent introduction of excessive noise in telephone circuits.

When two sections of cable are spliced together it is essential to have a good bond between the shields in adjacent cable sections to prevent any noise from being induced in the cable contained communication wires. A break in the bond or a defective bond resulting from corrosion or cracks in the bonding medium can result in severe noise problems. While only one high resistance bond or one completely open bond may not introduce much noise, the cumulative effect of a number of defective bonds can result in severe noise conditions.

The following data taken at various locations shows how much noise may be reduced by correcting defective bonds to cable shields at splice enclosures. Each cable has been given a reference number which is not related to its identification in the field. The noise measurements listed were taken before any repairs were made to the cable and after all defective bonds had been corrected.

| Cable | noise measurements before | after | number of closures tested | defective | % defective |
|---|---|---|---|---|---|
| 1 | 24 dBrnc | 5 dBrnc | 108 | 42 | 39% |
| 2 | 27 " | 0 " | 20 | 7 | 35 |
| 3 | 37 " | 17 " | 150 | 33 | 22 |
| 4 | 42 " | 18 " | 196 | 16 | 8 |
| 5 | 42 " | 16 " | 56 | 4 | 7 |
| 6 | 49 " | 42 " | 41 | 13 | 32 |
| 7 | 75 dBrn | 67 dBrn | 170 | 30 | 18 |

Cables 1 through 5 were measured for noise metallic with C-message weighting. Cables 6 and 7 were measured for noise to ground. C-messaging weighting was used for cable 6 and Flat weighting was used for cable 7.

While defective bonds may not be the only noise contributing factor, it is quite evident that correcting defective bonds has a significant effect on the reduction of noise in communication cables, and that even a small percentage of defective bonds can cause as much trouble as a larger percentage.

PRIOR ART PROCEDURES

No satisfactory method or apparatus has heretofore been devised for effectively and quickly locating defective splicing or bonding or grounding of the shields in telephone or other communications cables; all of which permit electrical noise to be introduced in the conductors of the cable from external influences.

Reliable and quickly applied instruments are required to effectively determine the adequacy of grounding and shield splicing, so that positive measures can be taken to minimize the effects of the induction of undesirable signals or electrical noise and keep the amplitude of such signals within acceptable limits. Without suitable instruments to detect these defects, it is necessary to use laborious methods of disassembling splices for physical examination of each splice, or use cable and splice damaging picks or probes to penetrate the insulation for making electrical measurements directly on the shield. Neither method is satisfactory, since visual inspection cannot reliably detect the defect, and penetrating the outer insulation on cables often leads to further trouble which requires complete replacement of an otherwise satisfactory splice or cable.

PURPOSE OF THIS INVENTION

This invention relates to a method and apparatus for testing and evaluating the quality, integrity, continuity and grounding of the shield connection in a splicing section joining the adjacent ends of communication cables, where direct electrical connection to the shield test purposes is not feasible; and in general, for is particularly useful for locating and evaluating splices and bonds on shields of telephone, television, radio, and other similar communication cables.

In general, it is the purpose of this invention to provide a new and improved method and apparatus to accurately locate and determine the nature of faults that may exist in splices and and shielding connections between insulated and shielded communication cables, and which may be responsible for introducing unwanted noise in the communication wires contained in the cable.

It is a further purpose of this invention to provide effective apparatus, embracing two probes designed to be capacitively coupled to the communication cable in spaced relation, and a measuring set operating in coordinated relationship with the probes, and whereby measurements can be taken of the potential difference between the two probes, and whereby measurements can also be taken of the voltage picked up by each probe with reference to ground and which thereby provides the necessary technical information for analyzing the quality of the cable shielding and its ground connections.

It is a further object of this invention to provide a probe designed to be coupled to a selected section of an insulated and shielded communication cable to be tested, and which is relatively insensitive to variations in the degree of coupling such as might be caused by different thickness and dielectric constants of the insulating materials used on the cable or splice.

It is a further objective to provide means for supporting and positioning the probes in a manner to insure proper signal coupling between the probes and the communication cable under test, with resultant reliable readings of the noise signals, and which permits proper alignment of the probes to the axial slope and size of the communication cable which may vary in different installations.

GENERAL DESCRIPTION OF THIS INVENTION

The method and apparatus of this invention is adapted to be effectively used for making tests of the quality of shield bonds and ground connections in shielded and insulated communication cables, and for making a more comprehensive study of conditions existing on the cable shields at the central office, various overhead locations, cable vaults, manholes, crossconnect boxes and at various points along an accessible communication cable and all accessible splices. The defects which can be detected may not only be responsible for introducing noise in the communication wires contained in a communication cable but may also have a bearing on the degree of protection which the shielding provides against voltage surges and lightning.

For example, the apparatus of this invention is designed to determine if there is good bonding between the shields of adjacent sections of communication cable, and to determine if any of the following condition exist:

1. No bond between the shields of two or more communication cable sections.
2. An intermittent or high resistance band which may result from a corroded joint between bonding straps or between lashing wire and the cable shield, or defective bonding clamps and broken bonds.
3. The condition of capacitors used across insulated joints.
4. Bad ground connections to cables, ground busses, or cross-connect boxes.

The apparatus of this invention basically consists of two probes, a measuring set, and means for applying the probes to a communication cable by hand or with "lay-up sticks" to aerial cables from the ground. It may be used on aerial cable, pedestals, in manholes, in cable vaults, and at any point where there is access to a communication cable such as at crossconnect or terminal boxes.

Each probe assembly consists of a pickup electrode and a unity gain ultra high input impedance converting circuit. Noise signals, caused by an external source such as an adjacent power line, and transmitted to and existing on the cable shield are capacitively coupled, through the cable insulation, the the pickup electrode. This coupling capacitance is small, representing a high series impedance at power frequencies, and is also subject to large variations caused by field conditions. To make the pickup substantially independent of these variations, the input impedance of the converting circuit must be some two orders of magnitude higher than typical input coupling impedance.

To obtain this ultra-high input impedance, the impedance converted circuit embraces an integrated circuit unity-gain voltage follower and amplifier devices supported on a printed circuit board mounted on the bottom of the probe base. A shield electrode, laminated to the probe base under the pickup electrode, and covering all circuit points which might otherwise constitute stray-capacitance input shunts, are connected to the follower output to provide a driven shield. The follower circuit also provides a low output impedance, making it possible to connect the probe assembly to the measuring set through a fairly long unshielded conductor.

The signals from the two probes are connected through a switch to an input transformer of the measuring set. The difference between the voltages picked up by each probe with respect to ground will be measured when the switch is in the A to B position. When the switch is in the A to GND or the B to GND position, the voltage picked up by each probe with respect to ground may be measured. The ground terminal of the measuring set should be connected to a suitable ground.

The transformer output is connected to an attenuator with an attenuation range of 60 db in 10db steps. The output of the attenuator is connected to an operational amplifier consisting of two integrated circuits. A bridge rectifier meter circuit with an appropriate damping capacitor provides the means for measuring the signal level. The output stage is designed to provide peak clipping so that sudden wide signal level fluctuations will not permit the meter to go beyond full scale. This, in combination with the meter damping, facilitates reading the meter when severe signal fluctuations take place.

A calibration control is provided for calibrating the measuring circuit. For example, the calibration control may be so set that a signal of 1 volt will read ODB on the meter when the attenuator is in the O position. This is done by connecting a 1 volt signal at 500 Hz to the shield of a section of typical ALPETH cable of approximately 1 ¾ inch D and applying the probes to the cable. The ground terminal on the signal generator is connected to the ground terminal on the measuring set. The switch is placed in the A to GND or B to GND position, the attenuator in the O position, and the CAL control on the printed circuit board is adjusted for a reading of O on the meter. The set is now calibrated to read from +20 dbv to approximately −55 dbv.

A regulated power source is included to give a constant + and −16 volts with respect to ground from a 45 volt battery. Consequently, as the battery ages, performance of the set will not be impaired until the useful life of the battery is exhausted.

A switch is provided to check the voltage to ground measured by each probe. When the reference differential voltage is measured, the voltage to ground on each probe should also be checked. A defective splice will show a difference between these two readings. When the splice is intermittent, movement of the cable will show an erratic reading of the voltage to ground.

All cable shields will usually carry some induced voltage, derived from an exterior source such as an adjacent power line and having a frequency corresponding to the power line frequency and/or its harmonics. This voltage is dependent on a number of factors, including the proximity of power lines, and the location of grounds on the shield. When a bond between two sections of cable shield is good, the same potential will be observed at opposite ends of the splice. However, if the bond is open or defective, different voltages will appear at opposite ends of the splice. Measurement of the differential voltage across the spice and the voltage to ground at each end of the splice will reveal the quality of the bond between the shields of the cables involved. This apparatus provides the means for measuring these voltages.

The two probes are capacitively coupled to the shield of a communication cable by pressing the probes against the insulated sheath along the axis of the cable. A reference measurement may be taken by applying both probes to an intact section of the communication cable which is adjacent to the input end of the splice, and noting the reading. Theoretically, there should be no reading, but slight unbalance due to small differences between the probes and the spacing between each probe and the cable shield will result in a differential voltage which will be noted. The probes are then placed across a splice and another reading is taken. Experience has shown that if the two readings differ by more than about 4 db, trouble in the bond is indicated.

An open bond will show a difference of 15 db or more. A smaller difference usually is indicative of a high resistance contact of some kind. By moving the cable, a variety of erratic conditions can usually be detected. If, for example, there is an intermittent contact due to a corroded splice, a split tab, or a wiping contact resulting from a loose strap or clamp, the voltage measuring meter will move erratically as the cable is moved.

These two probes may be held by hand when it is possible to get direct access to the cable splice. When splices on aerial cables are to be checked from the ground, the probes may be mounted on a set of poles assembled into a T or cross formation. An extension line connects the probe conductors to the measuring set when the aerial cable is to be tested from the ground. Each probe is pivoted to permit alignment with the slope of the cable.

A ground lead is provided for connecting the measuring set to ground. The type of ground to be used is not critical as the voltages to be measured are referenced to the common ground used. Suitable grounds may be guy wires, metal fence or sign posts, water hydrants, a ground rod, or a screw driver pushed into the earth.

DESCRIPTION OF DRAWING

For a better understanding of the present invention together with the objectives thereof, reference is made to the accompanying drawings and the following description.

FIG. 7 is a side elevational view of one of the probes in substantially actual size, and which comprises the probe head adjustably mounted on a tubular handpiece, the handpiece being equipped with an adjustable crossbar securing clamp at the lower end thereof.

FIG. 8 is an end elevational view of the probe shown in FIG. 7.

FIG. 9 is a transverse cross section of the probe head as it would appear when viewed along line 9—9 of FIG. 7, this view showing certain structural details thereof.

FIG. 10 is an enlarged longitudinal cross section of the probe head as the same would appear when viewed along line 10—10 of FIG. 9, this view showing further details of the probe head construction.

FIG. 11 is a top plan view of the probe head.

FIG. 12 is a perspective view of the probe head block which supports a pair of insulated electrical energy conducting plates connected to a pair of signal wires extending through the block.

FIG. 13 is an enlarged transverse cross section of the probe head block and insulated electrical energy conducting plates as the same would appear when viewed along line 13—13 of FIG. 10.

FIG. 13A is an enlarged fragmentary cross section of the probe head block which more clearly illustrates its structural laminates.

FIG. 14 is a top plan view of the electronic components comprising the noise signal amplifying circuitry supported on the top side of a nonconducting board and contained within the probe head, as the same would appear when viewed in the direction of the arrows 14—14 of FIG. 10.

FIG. 15 is a plane view of the underside of the nonconducting board which shows the printed circuitry which electrically joins the electronic components shown in FIG. 14, and as the same would appear when viewed in the direction of the arrows 15—15 of FIG. 10.

FIGS. 16, 17 and 18 are transverse sections, taken along lines 16—16 and 17—17 and 18—18 of FIG. 14 of the probe head board, and which shows the electronic components electrically joined by the printed circuitry shown in FIG. 15.

FIG. 19 is a schematic diagram of the probe circuitry.

FIG. 20 is a top plane view of the measuring set whose measuring meter and electronic components and circuit arrangement is particularly designed for testing telephone cable and cable splicing.

FIG. 21 is an elevational view of the signal input receptacle located in exposed position at one end of the measuring set case, and as viewed in the direction of the arrows 21—21 of FIG. 20.

FIG. 21A is a transverse cross section of the input receptacle as viewed along line 21A—21A of FIG. 20, and showing the protected position of the recessed input prongs thereof.

FIG. 22 is a perspective view of the releasable plug designed for insertion into the signal input receptacle shown in FIGS. 20 and 21, said plug being shown connected to the cable which extends from the circuitry in the probe heads and contains the wiring which conducts the output signals from the probe circuitry.

FIG. 23 is a transverse section of the measuring set as it would appear when viewed in the direction of the arrows 23—23 of FIGS. 20 and 28, this view showing the power supply battery and some of the electronic components located in the measuring set case adjacent one end thereof.

FIG. 24 is a transverse section of the measuring set as it would appear when viewed in the direction of the arrows 24—24 of FIGS. 20 and 28, this view showing the measuring meter, electronic components and controls located in the measuring set case adjacent the opposite end thereof.

FIGS. 25, 26 and 27 are transverse sections of the measuring set showing various other electronic components thereof as the same would appear when viewed along lines 25—25, 26—26 and 27—27 respectively of FIGS. 20 and 28.

Similar reference characters refer to similar parts throughout the drawing figures and this specification.

APPLICATION OF THIS INVENTION

Figure 1:
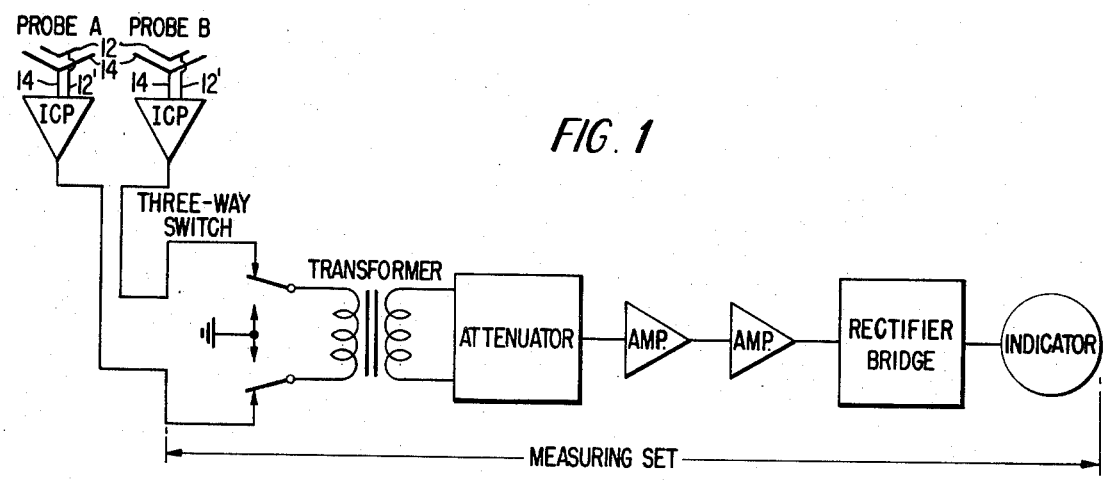
FIG. 1 is a block diagram which illustrates in a general way the electronic components which comprise the apparatus system of this invention and whereby the quality, integrity and continuity of the shields of shielded and insulated communication cables may be tested and determined.
Figure 2:
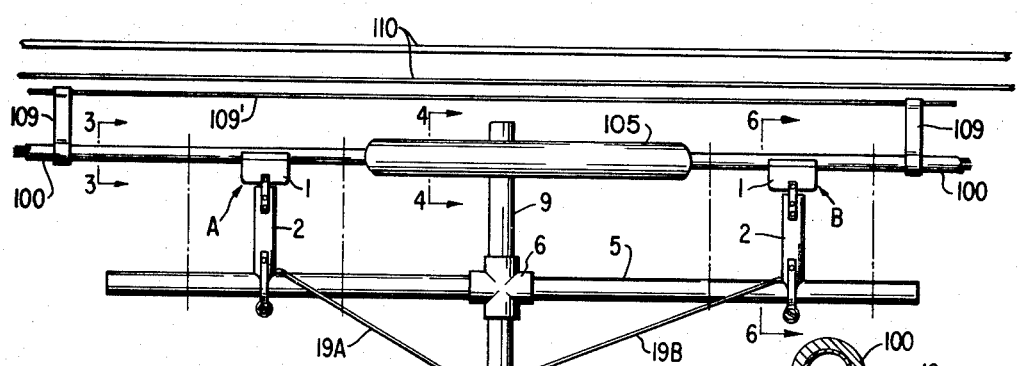
FIG. 2 is a plan elevation of a pair of testing probes adjustably mounted on a crossbar supported by a manually manipulated pole; this view also showing the probe heads applied across a communication cable section such as a splice to be tested; this view further showing the communication cable positioned adjacent a suspended power line whose surrounding electrical and magnetic fields may be the cause of electrical disturbances and interference in the cable wiring if the cable shielding is defective.
Figure 3:
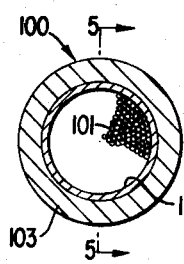
FIG. 3 is an enlarged cross section, taken along lines 3—3 of FIGS. 2 and 5, which exemplifies the construction of a typical telephone cable containing numerous telephone wires whose splice shields are to be tested.
Figure 4:
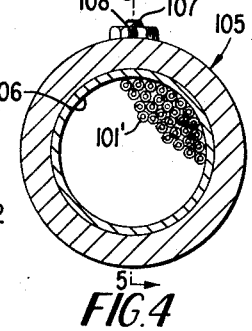
FIG. 4 is an enlarged cross section taken along lines 4—4 of FIGS. 2 and 5, which exemplifies a typical shielding connection at a splice section of telephone cable which contains the terminal ends of the telephone wires electrically connected together within the shield.

While the method and apparatus system of this invention is applicable to the testing of communication cables such as telephone, radar and television cables and various other electrical communication lines and systems, there is shown in FIG. 2 for purposes of exemplification, the application of this invention to the testing of the shielding of a telephone cable 100.

For purposes of illustration there is shown in FIGS. 2-5 the construction of a typical telephone cable 100 and a typical splice 105 which joins sectional lengths of the cable 100. The cable 100 normally contains numerous individual communication wires 101, contained in a tubular shield 102 which may made of flexible aluminum or steel alloy tubing which is wrapped in an insulating and protective jacket 103 which may be made of a nonconducting plastic composition.

Figure 5:
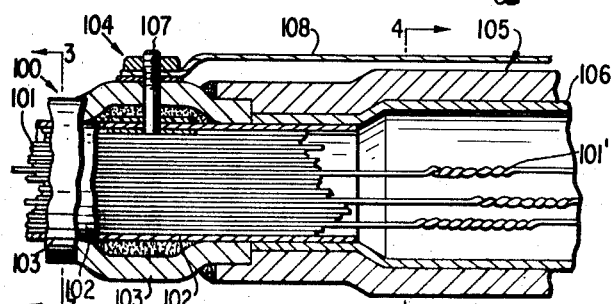
FIG. 5 is an enlarged fragmentary longitudinal section of the terminal end of a typical telephone cable and the adjacent end of the splicing shield, and which illustrates a typical splicing of paired telephone wires and the jumper which electrically joins the terminal ends of the cable shielding.

Since the telephone cable usually runs for extended distances, and is manufactured in practical lengths for handling, the ends of the cable sections 100 must be carefully joined together by a splice section 105 which contains the connected ends 101′ of the paired communication wires of adjacent cable sections 100. The connected ends 101′ are typically contained in a splice closure 106. In addition to maintaining the continuity of the paired communication wires, it is essential to maintain the shielding continuity of the shield of the cable in the splice closure. Continuous electrical connection between the shielding 101 at adjacent ends of the cable sections 100 which are to be spliced together, may typically comprise a clamp assembly 104 which makes electrical bond with the shield 102 of the cable section. Each clamp assembly presents a tab 107 projecting through the insulating jacket 103 as shown in FIG. 5. The projecting tabs 107 are bonded to the adjacent ends of the cable shields 103 of the cable sections 100 and the spaced tabs 107 are electrically joined by a conducting jumper 108 formed from a copper band or twisted copper wire as indicated in FIG. 5.

Telephone cable sections 100 and their tubular shields 102 as manufactured, are strong, flexible and continuous, and should withstand the strain of heavy winds and temperature changes for many years without damage to the shielding thereof. However, since the cable splices 105, clamp assemblies 104, connecting tabs 107 and jumper 108 must be field installed under precarious overhead or manhole conditions, they are sometimes defectively installed or become defective under the strain of use. Defects which exist or develop in the shield splice connections 104, 107 and 108 of the cable shield sections 102, will expose the individual communication wires 101 to exterior noise producing disturbances.

Noise producing disturbances in the communication wires often stem from the electrical and magnetic fields which surround a power line 110 positioned adjacent the telephone cable run, as indicated in FIG. 2. For example, power lines and telephone cables are often suspended from the same utility poles, with the telephone cable suspended by straps 109 from a wire cable 109′ positioned adjacent the power line 110 as shown in FIG. 2. Under such conditions, any defect in the continuity of the cable shielding results in objectionable disturbances and noise in communication transmission.

The Probe Head and Its Supporting Structure

The apparatus system of this invention embraces a pair of identical probes A and B designed to be adjustably mounted on a supporting structure for application in spaced relation to the cable section to be tested as shown in FIG. 2. Each probe has a probe head 1 comprising a probe block 10 formed from a nonconducting plastic, such as bakelite, and which presents, as shown in FIGS. 6-13, a V shaped face 10a designed to be telescoped over the cable section to be tested. The V shaped face of the block 10 presents a pickup electrode 12 in the form of a V shaped copper late. Positioned below and in insulated relation to the pickup electrode 12, is a shielding electrode 14 in the form of a V shaped copper plate which is somewhat wider and longer than the pickup electrode 12.

As shown in FIGS. 6-13, the probe block 10 is supported on the rim of a probe box 11 which may be approximately 3 inches long by 2 inches wide by 2 inches high. The box 11 is preferably molded from a plastic or metallic composition characterized by substantial mechanical strength and which will withstand the shock of high voltage without breakdown and which permits adequate shielding for the electronic circuitry therein. The plastic block 10 presents a contracted bottom section 10' which defines an inset shoulder 10'' which seats on the upper rim of the probe box 11. The block 10 is secured to the side walls of the box 11 by a series of screws 10''', as shown in FIGS. 9 and 11. The probe box 11 contains electronic impedance converting circuitry as hereafter described.

The V shaped shielding electrode 14 is bonded with an appropriate adhesive by heat and pressure to the upper V shaped face of the plastic block 10. The V shaped shielding electrode 14 is bonded to and insulated from the V shaped pickup electrode 12 by an insulating laminate 13 formed of two layers of a polyimid plastic. The upper face of the V shaped pickup electrode 12 and the surrounding surface, is coated with a layer 13' of a plastic such as a polyimid to provide a smooth cable contacting surface which resists physical abrasion, and provides voltage protection. The plastic baseblock 10, the shielding electrode 14, the plastic insulating laminate 13, the pickup electrode 12 and the plastic coating layer 13' are bonded together into a compact unit under heat and pressure, producing a structure which is best shown in FIG. 13A. To insure effective electrical contact between the V shaped pickup electrode 12 and various cables of both large and small diameters, it has been found that the V angle as shown in FIG. 13 should be in the order of 90° to 150°, and preferably in the order of approximately 130°.

Each probe head 1 is desirably supported by a handpiece or stem section 2 which may be formed of fiber glass reinforced plastic tubing as shown in FIGS. 2, 6, 7 and 8 which is approximately 6 to 12 inches long and provides a convenient handpiece. The stem section 2 may be filled with urethane foam or similar material to exclude the entry of moisture therein. The probe circuit containing box 11 is adjustably connected to the tubular handpiece 2 by a pair of diametrically opposed pivot brackets 3 secured as by screws or bolts 3' to the upper portion of the tubular handpiece 2. The upper end of the paired pivot brackets 3 are pivotally connected to the opposite sidewalls of the probe box 11 by friction screws 3'' which permits the probe head to be frictionally held in a tilted position which best accommodates the cable section to be tested.

To provide for convenient application of both probe heads to an overhead cable section to be tested, the handpiece or stem sections 2 of both probes A and B may be adjustably supported on a crossarm 5 of convenient length for test purposes. The crossarm 5 may be medially connected by a four way coupling 6 to a layup pole 7, whose lower end may be provided with a ferrule connection 7' for application of an extension pole 8 as indicated in FIG. 2. A bracing extension 9 which may be secured to the coupling 6 can be conveniently braced against the cable section under test to insure quick and convenient application of the probe heads 1 to the cable section. The crossbar 5, layup pole 7, pole extension 8 and bracing extension 9 may all be tubular in form, made from fiber glass reinforced plastic and filled with a urethane foam or similar material to exclude moisture.

Figure 6:
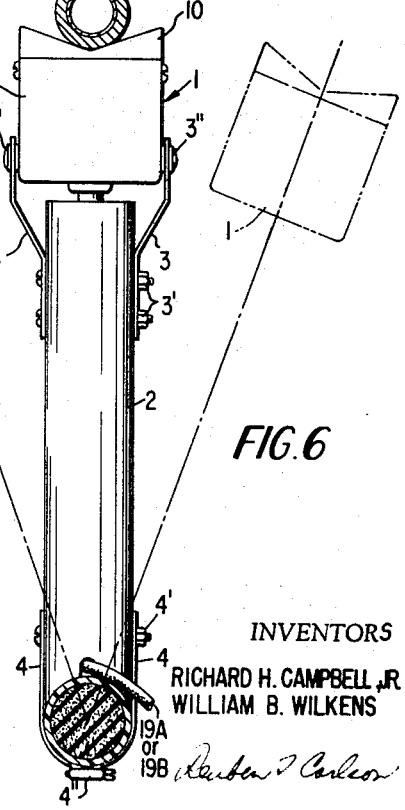
FIG. 6 is an end elevated view of one of the testing probes as the same would appear when viewed along line 6—6 of FIG. 2; this view illustrating the lateral adjustability of the probe on the supporting crossbar.

The lower ends of the probe stems 2 are adjustably secured to the crossarm 5 by means of an adjustable clamp 4 of U shaped form, as shown in FIGS. 2, 6, 7 and 8. The lower end 2' of each probe stem 2 is arcuate in form to snugly saddle against the upper side of the crossbar 5, while the lower and lateral sides of the crossbar are gripped by the side legs of the U clamp 4 as shown in FIGS. 2 and 6. The upper portions of the paired side legs of the clamp 4 are pivotally secured to the lower end of the probe stem 2 by a through bolt 4' which may be tightened and adjusted as desired. The side legs of the U clamp 4 are connected by takeup means 4'' for tightening the clamp in frictional embracing relation to the crossarm 5.

This mounting arrangement permits contact accommodation of each probe head to any overhead section of cable to be tested. For example, tilting the probe head 1 on the probe stem 2 may be accomplished by adjusting the clamp screws 3'' which secures the paired pivot brackets 3 to the probe head 1; by adjusting the takeup means 4'' of the clamp 4 the probe head 1 and its supporting stem 2 may be laterally swung into any desired position as shown in FIG. 6; and by manipulating the clamp 4 the probes A and B may be adjustably fixed in any desired spaced position along the crossbar 5. It will also be appreciated that the probe head supporting stems 2 may be removed from the crossbar 5 and hand supported, in cases where the position of the cable to be tested, such as in manholes or the like, would indicate.

The probe heads are mechanically constructed to provide the most effective degree of coupling between the pickup electrode 12 and the cable shield to be tested for a range of cable diameters, as indicated in FIGS. 6 and 13, by shaping the V shaped upper face 10a in a form which will accept a wide range of cable diameters.

As shown in FIG. 13A, the copper shielding electrode 14 is laminated to the upper face 10a of the base block 10, and the size of this shielding electrode 14 covers the angular upper face 10a of the base block to within approximately one-sixteenth inch of the exterior edges thereof, thus allowing the superimposed laminating layer 13' to not only cover the shielding electrode 14, but to adequately cover and protect the edges of the electrode 14 from electrical contact with any conductor, and thus provide a thickness of material which will insure a low dielectric constant and will keep the capacitance between the shielding electrode 14 and pickup electrode 12 to a minimum. This should not exceed five times the coupling capacitance between the cable and pickup electrode 12 which is laminated to the insulation 13.

The layer of insulation 13' possesses high dielectric and mechanical resistance to abrasion, and is laminated over the whole assembly to provide protection against contact with dangerous high voltages, and which will withstand the abuse of normal use. As shown in FIGS. 10, 12 and 13, lead terminals 12' and 14' which are electrically attached to the pickup electrode 12' and the shielding electrode 14, are passed through a bore 10b in the nonconducting baseblock 10 with adequate electrical clearance, and are in turn connected to an input amplifier forming a part of the probe circuitry 20. In order to keep the leads 12' and 14' extending from the pickup electrode 12 and the shielding electrode 14 as short as possible, and thereby minimize stray capacitance between the pickup electrode 12 and ground, the probe circuitry 20 is supported by a nonconductive mounting board 15 contained within the head box 11 and positioned as close as conveniently possible to the lower end of the baseblock 10. As shown in FIGS. 9, 10 and 14-15, the nonconducting board 15 is suspended within the probe box 11 by a pair of screws 16 and associated spacer collars 16' from the bottom side of the nonconductive headblock 10.

The Probe Circuitry

In general, the electronic components supported on the circuit board 15 in each probe head 1 include, a field effect transistor 22 whose gate 21 is connected to the lead terminal 12' of the pickup electrode 12; an operational amplifier 25 of voltage follower configuration; five resistors 32, 34, 38, 39 and 40; two capacitors 28 and 41; direct current negative and positive voltage supply terminals 31 and 33 which supply the direct current voltage to the terminals 23 and 29 of the field effect transistor 22 and the terminals 35 and 36 of the operational amplifier 25; a grounding terminal 37; and an output terminal 30 which receives the signals processed by the probe circuitry.

As shown in FIGS. 14-19, the pickup electrode 12 is capacitively coupled through the insulating jacket 103 to the cable shield 102 of the telephone cable 100, and the resulting signal is conducted by the pickup lead 12' to the gate 21 of a field effect transistor 22 (commonly called FET) which operates as a source follower. The output from the source terminal 23 of the field effect transistor 22 is connected by lead 23' to the noninverting input 24 of an operational amplifier 25. The output terminal 26 of the operational amplifier 25 is connected by lead 30' to the probe circuit output terminal 30.

It will also be noted that the output terminal 26 of the operational amplifier 25 is connected back to the inverting input terminal 27 of the operational amplifier 25 by leads 26' and 27' in the voltage follower configuration. The signal from the output terminal 26 of the operational amplifier 25 is also conducted back by leads 26' and 14' to the shielding electrode 14 so that the electrode 14 thereby operates as a driven shield. The lead 26' from the terminal 26 of the operational amplifier 25 is also connected to a capacitor 28 which in turn is connected by lead 28' to the drain terminal 29 of the field effect transistor 22.

The operating power for the field effect transistor 22 and operational amplifier 25 is supplied by a battery housed in the case of the measuring set C as hereafter described. The circuit board 15 in each probe head box 11 as a battery connected negative voltage supply terminal 31, and a battery connected positive voltage supply terminal 33 as shown in FIGS. 15 and 19.

The negative voltage supply terminal 31 is connected by lead 31' to a resistor 32, which has a lead 32' which is connected to the field effect transistor source terminal 23; and the positive voltage supply terminal 33 is connected by lead 33' to a resistor 34 which is connected to lead 28' which extends to the drain terminal 29 of the field effect transistor 22; thus providing the direct current operating power for the field effect transistor 22, The negative voltage supply terminal 35 of the operational amplifier 25 is connected by a lead 35' to lead 31' extending from the negative voltage supply terminal 31; and the positive voltage supply terminal 36 of the operational amplifier 25 is connected by a lead 36' to the lead 33' extending from the positive voltage supply terminal 33.

The lead 37' extending from the ground terminal 37 is connected to a resistor 38 which is in turn connected by lead 38' to a second resistor 39 whose lead 39' is joined to the pickup electrode lead 12' adjacent to its connection to the gate 21 of the field effect resistor 22. The lead 31' from the negative voltage supply terminal 31 is also joined to a resistor 40 as shown in FIGS. 15 and 19, and by a connection 40' to the lead 38' which connects the resistors 38 and 39. The connection 40' is also joined to a capacitor 41 which is connected at 41' to the output terminal 26 of the operational amplifier 25.

Noise signals, at power frequency and its harmonics which exist on the cable shield 102, are capacitively coupled, through the cable insulation 103 to the pickup electrode 12. This coupling capacitance is small, representing a high series impedance at power frequencies. This coupling capacitance is subject to large variation with field conditions, and the manner in which the probe face is placed in relation to the cable section to be tested.

Meaningful readings connot be obtained if the signal output at the output terminal 30 varies widely with small changes in probe positioning. While dependance on positioning cannot be eliminated entirely, it can be minimized if the effective impedance between the pickup electrode 12 and the ground or reference terminal 37 is made very much higher than the impedance between pickup electrode 12 and the cable shield 102 being measured. The impedance to the cable shield is capacitive, and in a typical case may be on the order of 10 picofarads capacitance, or 250 megohms reactive impedance at 60 Hz. If moderate variations in this impedance to cable shield source are to produce only small output variations, the effective impedance to ground must be several thousand megohms.

The probe circuitry above described, and illustrated in FIGS. 14-19, achieves the ultra-high impedance at the pickup electrode 12, by using a unity gain amplifier, consisting of the field effect transistor 22 and the voltage follower connected operational amplifier 25, and a driven shielding electrode 14 as diagramatically illustrated in FIG. 19. In using this technique, the shielding electrode 14 is made to surround the pickup electrode 12 on all sides, except that which comprises the capacitive impedance to the cable shield source. The shielding electrode 14 is also made to surround all wires and circuit points which are electrically connected to the pickup electrode 12. Also, the pickup electrode 12 is connected through the field effect transistor 22 to the noninverting input 24 of a unity gain, operational amplifier 25 whose input impedance is nominally infinite and actually extremely high.

The shielding electrode 14 is connected to the operational amplifier output terminal 30, by leads 14', 26' and 30'. The capacitive impedance between pickup electrode 12 and shielding electrode 14 may be several times smaller than the impedance which would have been present to ground without the shielding electrode. If the amplifier gain is precisely unity, there is no potential difference across this impedance and so its effective value is infinite. The precise unity gain is approached very closely by using an amplifier 25 with high open loop gain connected in the so called voltage follower configuration. The capacitance to the shielding electrode 14 is theoretically of no importance; in practice it is of far less importance than capacitance to ground, but still should be held to a reasonable minimum.

The probe circuitry embodying the above principle as shown is FIGS. 14-19, embraces the pickup electrode 12 which is capacitively coupled through the cable insulation 103 to the cable shield 102 of the telephone cable 100. The pickup electrode 12 is connected to the gate 21 of the field effect transistor 22 which operates as a source follower. The output signal from the source terminal 23 of the field effect transistor 22 is connected by lead 23' to the noninverting input 24 of the operational amplifier 25. The output terminal 26 of operational amplifier 25 is connected back to the inverting input terminal 27 by leads 26' and 27' in the voltage follower configuration. This same signal is also connected by leads 26' and 14' to the driven shielding electrode 14.

The input impedance at the noninverting input 24 of the voltage-follower connected operational amplifier 25, is approximately 400 megohms shunted by one picofarad capacitance. This is a very high impedance, but not high enough, which is why the field effect transistor 22 connected as a source-follower is added. Some of the effective high input impedance at the operational amplifier input 24 is lost in the shunt effect of resistor 32 connected by lead 31' to the negative voltage supply terminal 31 which supplies operating current for the field effect transistor 22. However, resistor 32 has a high value, so that the source-follower action of the field effect transistor 22 with high impedance source load, results in extremely high input impedance at gate 21.

It is necessary to provide a resistive connection to the gate 21 to establish the proper D.C. operating point. This operating point is established by voltage-divider action of resistors 38 and 40, connected between ground terminal 37 by lead 37' and negative voltage terminal 31 by lead 31'. The voltage-divider output at point 40' is connected by lead 38' through resistor 39 to the gate 21. Although resistor 39 has a value of several megohms, it is so much lower than the required impedance at pickup electrode 12 and gate 21 that it would completely destroy the circuit operation were it not for capacitor 41. This capacitor 41 is connected so as to cause the bias point 40' to follow the signal frequency voltage at the output 26 of operational amplifier 25. Since the overall circuit works at unity gain, or very nearly so, there is thus essentially no signal frequency potential across resistor 39 and so its effective shunt impedance value is essentially infinite.

If the drain terminal 29 of the field effect transistor 22 were directly connected to positive power supply terminal 33, the internal gate to drain capacitance in the field effect transistor 22 would effectively shunt the input and so lower the impedance. This effect is essentially eliminated by means of a bootstrapping connection, where the drain terminal 29 of the field transistor 22 is connected to positive voltage supply 33 by lead 33' through resistor 34 for direct current, and to the operational amplifier output 26 through capacitor 28 at signal frequency.

As shown in FIGS. 9 and 10, the probe circuit board 15 in the probe head 1 supports the ground terminal 37 connected by a lead 37a which is connected to the circuitry of the measuring set C. The ground terminal 37 may also be grounded by lead 37b to a grounding element 17 supported by the wall of the probe box 11. The circuit board 15 supports a negative voltage supply terminal 31 and a positive voltage supply terminal 33 respectively connected to leads 31a and 33a which also extend to the circuitry of the measuring set C. The circuit board supported terminal 30 whose signals are processed by the probe circuitry has a lead 30a which extends to the circuitry of the measuring set C. The terminal leads 37a, 33a, 31a and 30a are grouped into a flexible nonconducting tube 18 which extends through a nipple 19 fitted into a hole formed in the bottom wall of the probe box 11. The lead containing tube 18 may be enclosed in a flexible nonconducting jacket 19'.

A probe cable assembled as above described extends from the probe head 1 and through the tubular handpiece 2 thereof. Since the probe circuits 20 in both probes A and B are identical, probe cables 19A and 19B formed as above described extend from the lower ends of the two handpieces as shown in FIG. 2. The probe cables 19A and 19B are telescoped through a flexible conduit 45 whose lower end is attached to a plug 46 as shown in FIG. 22, which presents five end face sockets.

The probe connected plug 46 is designed to be plugged into a recessed receptacle 48 having five corresponding prongs, as shown in FIGS. 21 and 21A. Receiving receptacle 48 is mounted on an end wall of the measuring set case 50 as shown in FIGS. 20 and 21. The plug 46 incorporates a lock device 46' by which the plug may be realeasably locked in proper connected position to the receiving receptacle 48. When the five sockets in the plug 45 have been telescoped over the corresponding five prongs of the receptacle 48, electrical connection is made between the measuring set C and the circuitry 20 of both probes A and B, namely; one prong 31a' is the terminus of the negative voltage supply leads 31a from both probes A and B; a second prong 33a' is the terminus of the positive voltage supply leads 33a from both probes A and B; a third prong 37a' is the terminus of ground leads 37a from both probes A and B; a fourth prong 30A is the terminus of the probe circuitry output lead 30a from probe A; and the fifth prong 30B is the terminus of the probe circuitry output lead 30a from probe B.

The Measuring Set

The electronic components of the measuring set C are mounted on or contained in a sturdy case 50 which may be approximately 6 inches long by 4 inches wide by 2 to 3 inches deep, as shown in FIG. 20, and FIGS. 23–27. The case 50 may be provided with a carry handle 50' at one end thereof, and has a removable front panel 51 detachably secured to the case by screws 51'. Some of the electronic components of the measuring set C are supported in suspended position from the front panel 51, and other electronic components are supported on a printed circuit board 52 contained in the case 50 and mounted by a pair of screws 52' are part of the meter M that is mounted on the front panel 51.

The measuring set case 50 also contains a dry cell battery 53 held in position by a bracket 53a secured to the bottom wall of the case as shown in FIGS. 23–27. A 45 volt dry cell battery 53 is sufficient to provide the power for all power driven electronic components of the probes A and B and the measuring set C without imposing an excessive load on the battery. The positive battery output terminal 53" is connected to an on-off power switch 54 supported from the front panel 51 as shown in FIGS. 20 and 23 and having a lever 54a which provides the means to connect or disconnect the battery power to the probe head circuitry 20 and measuring set circuitry.

The front panel 51 supports a measuring meter M having a visible arcuate scale 55a marked in decibels (dB). The results of the cable shield tests are indicated on the decibel scale 55a by pointer 55b, and the results of capability tests of the battery 53, used to supply the direct current power requirements to certain electronic components, is read on scale section 55a'. The pointer 55b is manipulated by a standard d'Arsonval movement assembly 55 whose shell is attached to the underside of the front panel 51 as shown in FIGS. 20, 24 and 27.

The d'Arsonval movement essentially consists of a wound core 55c to which the base end of the pointer 55b is fixed. The wound core is rotatably mounted between the ends of a horseshoe magnet 55d, and the core 55c and its pointer 55b will swing or rotate an angular distance depending upon the current supplied to the wound core. Since the meter input current supplied to the negative input terminal 55' and positive input terminal 55" of the meter M has been processed through the probe circuitry and measuring set circuitry, this input current constitutes a reliable measure of the difference in voltages picked up by the cable applied probes A and B, probe A to ground, and probe B to ground, and is translated in terms of decibels (dB) on the meter scale 55a.

The scale section 55a' of the meter M provides the means for periodically testing the power output capability of the battery when the off-on switch 54 is in the ON position. The means for testing the battery 53 includes a battery test switch 56 suspended from the front panel 51 and operated by a push button 56a as shown in FIGS. 20 and 23. The battery test switch 56 is connected to the positive terminal 53" of the battery, and through a resistor 83 to electronic components in the measuring set which provides the current to operate the pointer 55b of the meter over the scale section 55a' thereof.

The underside of the cover panel 51 also supports a three way switch 57 which may be manipulated by a lever 57a, as shown in FIGS. 20 and 23. In the normal upright position of lever 57a the switch 57 makes electrical connection with the signal outputs 30 from the probes A and B (A to B); in one tilt position of lever 57a the switch 57 makes electrical connection with the circuit output 30 of probe A and ground (A to GND), and in an opposite tilt position of lever 57a the switch 57 makes electrical connection between the circuit output 30 of probe B and ground (B to GND). The voltage output from the circuit connections made by the switch 57, have been previously processed by the probe circuitry 20, and this voltage output is further processed by the measuring set circuitry before reaching the negative and positive input terminals 55' and 55" of the measuring meter M. The switch 57 also embraces a pair of grounding contacts connected in series to a binding post 58 and thence to a common grounding terminal 59 supported on the circuit board 52 as shown in FIG. 23. The grounding prong 37 a' connected to terminals 37 of probes A and B is also connected through a cable to the binding post 58 and to the common grounding terminal 59.

Figure 28:
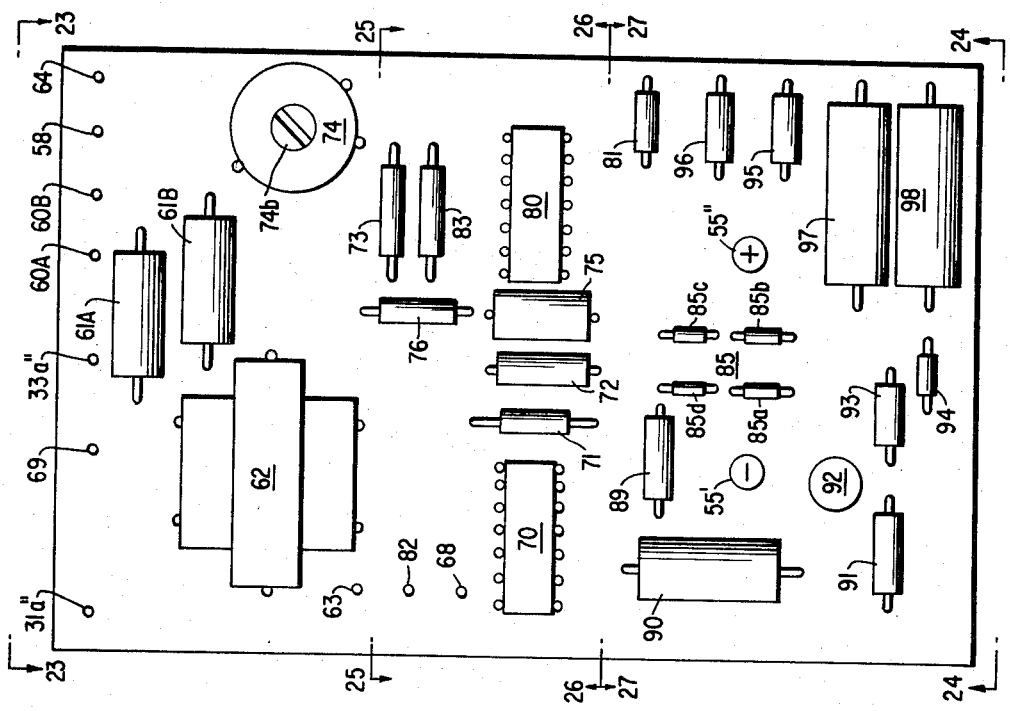
FIG. 28 is a top plane view showing the electronic components of the circuitry mounted on a nonconducting board contained in the measuring set case.

The signal output leads from the three way switch 57 are connected through a pair of terminals 60A and 60B to a pair of coupling capacitors 61A and 61B thence to the primary winding of a transformer 62 mounted on the circuit board 52 as shown in FIGS. 23 and 28. The coupling capacitors 61A and 61B supply the signal voltages to the transformer primary winding in such a way that the two voltages will balance out if their amplitudes and phases are equal.

Figure 30:
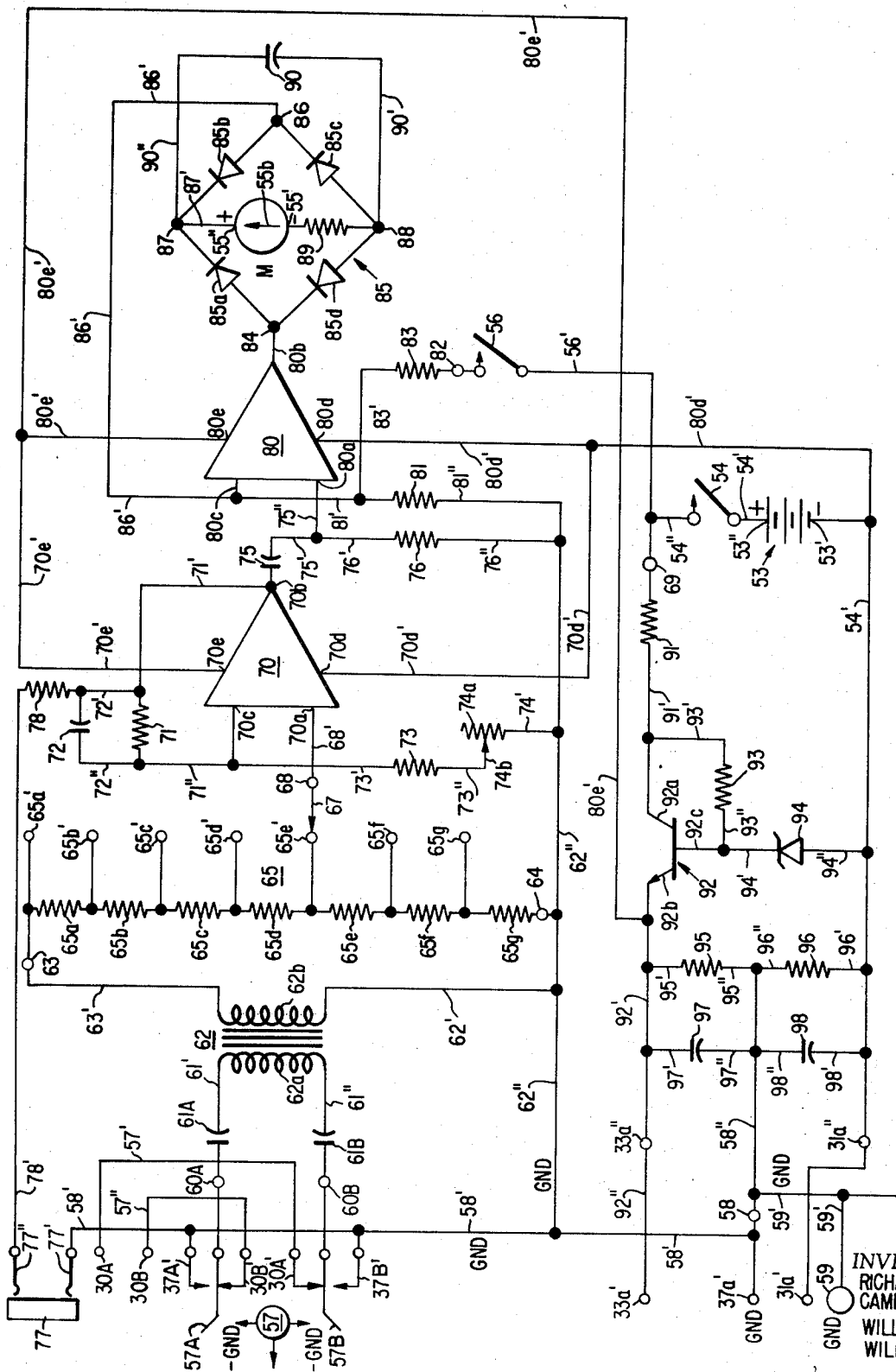
FIG. 30 is a schematic diagram of the measuring set circuitry.

The secondary winding of the transformer 62 is connected to the opposite ends of an attenuator or voltage divider 65 which includes seven resistors 65a–65g connected in series and mounted on switch 67 suspended from the underside of the front panel 51 as shown in FIGS. 20, 25 and 26. One end of the attenuator 65 is connected through a terminal 63 to the secondary winding of the transformer 62, and the other end of the attenuator 65 is connected to a terminal 64 which is grounded to the common grounding post 59, as shown in FIG. 30. The seven resistors 65a–65g comprising the voltage divider 65 are connected to the seven fixed contact terminals of switch 67 as shown in FIGS. 25 and 26. Switch 67 has a manipulating knob 67a mounted on the front panel 51 and whose pointer 67b may be swung over a scale 67c whose dBV markings as shown in FIG. 20 are selected to provide incremental attenuator steps, such as 10 decibels each, and which have been found convenient for measuring the signals customarily existing on telephone cable shields.

Figure 29:
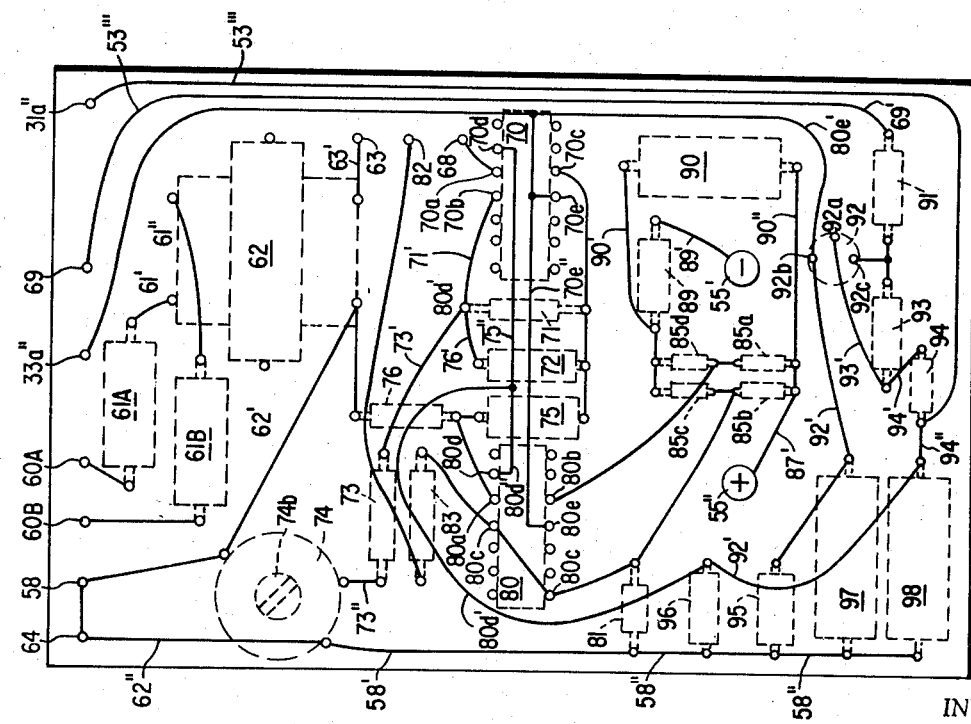
FIG. 29 is a plane view of the underside of the nonconducting board contained in the measuring set case, this view showing the printed circuitry which electrically joins the electronic components shown in FIG. 28.

The moving-contact terminal of attenuator switch 67 is connected through a terminal 68 to the noninverting input of a first stage operational amplifier 70, and the output terminal of the operational amplifier 70 is connected through a capacitor 75 to the noninverting input of a second stage operational amplifier 80 supported by the circuit board 52 as shown in FIGS. 25, 26, 28, and 29. The output terminal of the first stage operational amplifier 70 is also connected through a resistor 71 and shunt capacitor 72 to the inverting input of amplifier 70. The inverting input of amplifier 70 is also connected through a resistor 73 to a grounded calibration control assembly 74 containing a variable resistor which can be manually set by an element 74b as shown in FIGS. 28 and 29, and whereby the gain produced by the first stage operational amplifier 70 can be established as desired.

The output terminal of the second stage operational amplifier 80 as shown in FIGS. 25, 26 and 28 is connected to one input terminal of a rectifier bridge 85 embracing four diodes 85a, 85b, 85c and 85d as shown in FIGS. 27 and 28, which forms a part of the circuitry of the meter M. The other input terminal of the rectifier bridge 85 is connected to the inverting input terminal of the second stage operational amplifier 80. The noninverting input terminal of the second stage operational amplifier 80 is connected to a grounded resistor 76, and the inverting input terminal of operational amplifier 80 is also connected to a grounded resistor 81. A resistor 83 supported by circuit board 52 is connected through terminal 82 to battery test switch 56 as shown in FIGS. 23 and 28 and to the inverting input terminal of amplifier 80. The battery test switch 56 is also connected through terminal 69 to the positive terminal 53'' of the battery 53.

The positive output terminal of the rectifier bridge 85 positioned between the diodes 85a and 85b thereof is connected t the position terminal of the d'Arsonval meter assembly 55 and the negative output terminal between the diodes 85c and 85d of the bridge 85 is connected through a resistor 89 to the negative terminal of the meter assembly 55 as shown in FIGS. 27 and 28. The current thus supplied manipulates the meter pointer 55b. A damping capacitor 90 is connected to the output terminals of the bridge 85. The value of the resistor 89 is so chosen that the meter M will read full scale when the voltage output from the second stage operational amplifier 80 is near its maximum value. A small further increase in the signal level will overdrive the amplifier 80 and thereby clip the peak of the signal. The damping capacitor 90 serves to dampen any severe and rapid signal voltage fluctuations.

The negative terminal 53' of the battery 53 is connected to the terminal jack 31a'' mounted on the circuit board 52 as shown in FIG. 23, and thence to the negative input terminals 31 of probes A and B through the jack 31a' of the recessed connector 48 and connecting cables 19A and 19B. The negative battery terminal 53' connected to terminal 31a'' is also connected to the negative input terminals of the first and second stage operational amplifiers 70 and 80.

The positive terminal 53'' of the battery 53 is connected through the off-on switch 54 to the terminal 69 mounted on the circuit board 52 which is connected to a resistor 91 which is connected to the collector terminal of a transistor 92, as shown in FIG. 28. The base terminal of the transistor 92 is connected by a shunt resistor 93 to the collector terminal of the transistor 92 and by a zener diode 94 through terminal 31a'' to the negative battery terminal 53'. The resistors 91 and 93 connected in series with the transistor 92, and operating in combination with the zener diode 94, comprise a voltage regulator circuit which insures a constant positive voltage supplied from the emitter terminal of transistor 92 which is connected to the terminal 33a'' on the circuit board 52. Terminal 33a'' is connected to the positive input terminals of the first and second stage operational amplifiers 70 and 80 and is also connected to the positive input terminals 33 of the probes A and B through the terminal prong 33a' in recessed connector 48 and the connecting cables 19A and 19B. Thus the battery 53 supplies the power for the operational amplifier 25 and the field effect transistor 22 of the probes A and B, and also the operational amplifiers 70 and 80 of the measuring set C.

As shown in FIGS. 28 and 29, a pair of similar resistors 95 and 96 supported on the circuit board 52, are connected to the positive and negative output leads from the voltage regulator, and their junction is connected through a common lead which extends to the terminal 58 and thence to the common grounding post 59. Thus a voltage electrically centered between positive and negative supply voltages is established and connected to ground.

A pair of capacitors 97 and 98 as shown in FIGS. 28 and 29, are also connected to the positive and negative output leads from the voltage regulator and are also grounded by the common lead which extends to the terminal 58 and thence to the common grounding post 59. The capacitors 97 and 98 operate to filter out unwanted signals from the power supply.

To summarize, the electronic components embraced by the circuitry of the measuring set as shown in FIGS. 20 and 23-28 include seven capacitors 61A, 61B, 72, 75, 90, 97 and 98; a transformer 62; a voltage divider or attenuator 65; a calibration control adjustor 74; a first stage operational amplifier 70; a second stage operational amplifier 80; a total of ten resistors 71, 73, 76, 81, 83, 89, 91, 93, 95 and 96 variously positioned in the metering set circuitry; a rectifier bridge 85 embracing four diodes 85a, 85b, 85c and 85d connected in series; a transistor 92; a zener diode 94; and a meter M which reveals the results of all tests on a decibel scale. A total of 10 terminal jacks or posts are also mounted on the circuit board as indicated in FIGS. 25, 28 and 29 to facilitate wiring.

The Measuring Set Circuitry

The several electronic components mounted on the front panel 51 and circuit board 52 of the measuring set C are connected in operative circuitry in the manner indicated in FIGS. 28, 29 and 30 herebelow more fully described.

The signal output prong 30A of probe A and the signal output prong 30B of probe B, contained in the recessed receptacle 48 shown in FIGS. 21 and 21A are respectively connected by leads 57' and 57'' to the fixed input contacts 30A' and 30B' of the three way switch assembly 57 as indicated in FIG. 30. The switch 57 also has a grounding contact 37A' and a grounding contact 37B' connected in series by lead 58' to a terminal 58 mounted on the circuit board 52 and thence by leads 59' to the common grounding post 59 mounted on the front panel 51. The grounding prong 37a' of the recessed receptacle 48 shown in FIGS. 21 and 21A, which is connected to the grounding prongs 37 of probes A and B, is also connected to the terminal 58 and then by grounding lead 59' to the common grounding post 59 as shown in FIG. 30. Thus the grounding post 59 provides a common ground for the grounding terminals 37 of probes A and B and for the grounding contacts 37A' and 37B' of the measuring set switch 57.

The switch 57 has a flexible contact arm 57A positioned between signal input contact 30B' and grounding contact 37A', and a flexible contact arm 57B positioned between signal input contact 30A' and grounding contact 37B'. The flexible contact arms 57A and 57B normally remain in contact with the fixed signal input contacts 30A' and 30B' as shown in FIG. 30 to thereby permit a reading on the meter M of the voltage differential between the signal output terminal prongs 30A and 30B of the probes A and B.

By tilting the lever 57a of switch 57 into the position A-GND, as shown in FIGS. 20, 23 and 30, the flexible switch contact arm 57A is pushed out of electrical contact with signal input contact 30B' and into circuit connection with ground contact 37A', so that a reading on meter M can be taken of the output voltage between signal output prong 30A of probe A and grounding contact 37A' (A-GND) of the switch 57. By opposite tilting of the switch knob 57a into the position (B-GND) the flexible contact arm 57B is pushed out of contact with signal contact 30A' and into the grounded contact 37B', so that a reading on the meter M can be taken of the output voltage between signal output prong 30B of probe B and grounded contact 37B' (B-GND).

The leads from the flexible contact arms 57A and 57B are connected to terminals 60A and 60B and thence to coupling capacitors 61A and 61B, as shown in FIGS. 28, 29 and 30. The output leads 61' and 61'' from capacitors 61A and 61B are connected to the primary winding 62a of a transformer 62. The voltage signals from probes A and B, are normally conducted by the flexible arms 57A and 57B of the three position switch 57 to the coupling capacitors 61A and 61B and thence to the primary winding 62a of the transformer 62. Since the signal voltages from the probes A and B are connected to opposite ends of the transformer primary winding by the coupling capacitors 61A and 61B, they will balance out if they are equal in amplitude and phase. Voltage to ground (GND) measurements from the signal output prongs 30A and 30B of each probe A and B may be made by adjusting the switch knob 57a to A-GND or B-GND position, thereby connecting terminal 60A or 60B to ground.

One end of the output winding 62b of the transformer 62 is connected by leads 62', 62' and 58' to the board supported terminal 58 and then grounded to the common grounding post 59 by grounding lead 59' as shown in FIGS. 29 and 30. The other end of the transformer output winding 62b is conducted by lead 63' to the terminal 63, as shown in FIGS. 28, 29 and 30, which is in turn connected to one end of an adjustable voltage divider or attenuator assembly 65. The other end of the attenuator is connected to terminal 64 which is grounded by leads 62'', 58' and 59' to the common grounding post 59. The attenuator assembly 65 embraces seven resistors 65a through 65g connected in series, and sets the level of the signals applied to operational amplifiers 70 and 80.

In the exemplification shown in FIG. 30, the value of each resistor 65a through 65g is selected to provide incremental attenuation steps of ten decibels (dB) each. Other incremental values may be used if a lesser or greater degree of attenuation is desired. The 10 dB increments shown on each position of the attenuator or voltage divider 65 have been found convenient for measuring the signals customarily existing on telephone cable shields. When the voltage divider 65 is in the 0 dB position 1 volt applied between terminals 60A and 60B will produce a 0 dB indication on the meter. Other voltage values may be selected as desired to accommodate a particular application.

Each of the seven attenuator resistors 65a through 65g is mounted on switch 67 suspended from the front panel 51 as shown in FIG. 25. Each resistor 65a through 65g presents a corresponding fixed contact terminal 65a' through 65g' on switch 67 as shown in FIG. 30. The moving contact terminal 68 of switch 67 is connected through the lead 68' to the noninverting terminal 70a of a first stage operational amplifier 70. The switch 67 presents a manipulating knob 67a and 67b as shown in FIGS. 20 and 25.

The moving contact terminal 68 of switch 67 may be swung into circuit contact with any one of the fixed contact terminals 65a' through 65g' by manipulating the switch knob 67a as shown in FIGS. 20 and 25 so that its pointer 67b aligns with the decibel markings (dBV) of the scale 67c imprinted on the top face of the front panel 51. The scale 67c has decibel (dBV) markings corresponding to the incremental attenuation steps of ten decibels (dB) of the attenuator resistors 65a through 65g and the scale markings 55a on the measuring set meter M. In FIG. 30 the terminal 68 is shown in contact with the fixed contact terminal 65e' which is the zero (0) position of the attenuator. By an appropriate manipulation of the switch knob 67a, the switch 67 may be adjusted to make circuit contact with any one of the output terminals 65a' through 65g' of the attenuator 65.

The moving contact 68 is connected through lead 68' to the noninverting input terminal 70a of the first stage operational amplifier 70, as shown in FIGS. 26, 28, 29 and 30. Operating power for the first stage operational amplifier 70 is supplied by the battery 53. Battery negative terminal 53' is connected by leads to the negative input terminal 70d of the amplifier 70 and the positive terminal 53'' of the battery 53 is connected by leads to the voltage regulator transistor 92 and thence by leads 80e' and 70e' to the positive input terminal 70e of the amplifier 70. The output terminal 70b of operational amplifier 70 is connected to the inverting input terminal 70c of the operational amplifier 70 through a resistor 71 by leads 71' and 71''. The terminal leads 72' and 72'' of a shunt capacitor 72 are connected to the input and output terminals of the resistor 71. The capacitor 72 operates to cause the high frequency response of the operational amplifier 70 to roll off an thereby suppress unwanted high frequencies.

The gain produced by operational amplifier 70 is established by the ratio of the feedback resistor 71, connected between the output terminal 70b and the inverting terminal 70c of the operational amplifier 70, and the series combination of a second resistor 73 connected by leads 71'', 73' and 73'' between the feedback resistor 71 and a variable resistor 74a forming a part of the calibration control assembly 74 as shown in FIGS. 23, 28, 29 and 30. The resistance of the calibration control resistor 74a, which is grounded by leads 74'-62κ and 58', may be manually set by manipulation of a contact element 74b, as shown in FIGS. 28 and 30, to thereby regulate and adjust the gain produced by the operational amplifier 70. Thus the reference point 0 on the meter M may be calibrated for a specific voltage picked up by probe A to ground (A-GND) and/or picked up by probe B to ground (B-GND) at their point of application to the cable 100, and which picked up voltage is delivered to contacts 30A' and 30B' of the switch 57.

The output terminal 70b of the operational amplifier 70 delivers the signal voltage processed by the operational amplifier 70 to a capacitor 75 and thence by lead 75' across a resistor 76 and by lead 75'' to the noninverting input 80a of a second stage operational amplifier 80 as shown in FIGS. 25, 28, 29 and 30. The resistor 76 is grounded by lead 76'' to the common grounding lead 62''. The negative input terminal 80d and positive input terminal 80e of the second stage operational amplifier are connected by leads to the negative and positive terminals of the battery 53 as hereafter explained.

The output terminal 80b of the amplifier 80 is connected to one input terminal 84 of a rectifier bridge 85 which consists of four diodes 85a, 85b, 85c and 85d connected in series, as shown in FIGS. 27-30. Signal current feedback to the operational amplifier 80 is provided by connecting the other input terminal 86 of the bridge 85 by lead 86' to the inverting input terminal 80c of the second stage operational amplifier 80. A resistor 81 is connected by lead 81' to the inverting input terminal 80c of the amplifier 80, and by lead 81'' to the common grounding lead 62''. The current feedback from the input terminal 86 of the bridge 85 to the inverting input terminal 80c of the second stage amplifier 80, operating in combination with the resistor 81, establishes the current supplied to the measuring meter M.

As indicated in FIGS. 27 and 30, the positive signal output terminal 87 between diodes 85a and 85b of the bridge 85 is connected by lead 87' to the positive input terminal 55'' of the meter M, and the negative signal output terminal 88 between diodes 85d and 85c of the bridge 85 is connected by resistor 89 to the negative signal input terminal 55' of the meter M. The value of resistor 89, connected in series with the meter M, is chosen so that the meter M will read full scale when the voltage at the output terminal 80b of the second stage operational amplifier 80 is near its maximum value. Thus, with a small further increase in the signal level, amplifier 80 is overdriven and clips the peaks of the signal. A damping capacitor 90, connected by leads 90' and 90'' across the meter circuit, provide damping of severe and rapid signal voltage fluctuations. The combination of meter damping and amplifier clipping facilitates reading the meter when severe signal fluctuations take place on the cable shield 102. The amplifier clipping also prevents the meter M from becoming damaged by limiting the meter current to a value slightly greater than that required to move the meter pointer to its full scale limit.

The current supplied to the meter M is independent of the characteristics of the bridge diodes 85a, 85b, 85c and 85d, the meter circuit resistor 89 and meter circuit components, because the current feedback supplied by lead 86' extending from terminal 86 of the bridge 85 to the inverting input terminal 80c of the second stage operational amplifier 80, operates in combination with the resistor 81. In operation, the amplifier 80 forces the feedback signal voltage at the inverting input terminal 80c of the second stage amplifier 80, to equal the input voltage supplied to the noninverting input terminal 80a of the operational amplifier 80. Since the feedback signal at inverting input terminal 80c equals the meter current multiplied by the resistance value of resistor 81, the input voltage at noninverting input terminal 80a, divided by the resistance value of resistor 81, will equal the meter input current, regardless of the rectifier bridge 85 or meter circuit characteristics. Both positive and negative half cycles of the alternating frequency feedback current flow in the same direction through the meter, so that the meter responds to the full-wave average value of alternating frequency input.

Power Supply Circuitry

The negative terminal 53' of the power supply battery 53 is connected by lead 54' to a terminal 31a'' mounted on the circuit board 52 and which is in turn connected to the negative power input prong 31a' of the recessed receptacle 48 and which leads to the negative power supply terminals 31 of the probes A and B. Another lead 80d' extends from the negative battery terminal 53' to the negative power input terminal 80d of the second stage operational amplifier 80, and a lead 70d' extends from the negative battery terminal 53' to the negative power input terminal 70d of the first stage operational amplifier 70, as indicated in FIG. 30.

The positive power output terminal 53'' of battery 53 is connected by lead 54' to the on-off switch 54, and the switch lead 54'' is connected to a terminal 69 mounted on the circuit board 52, as shown in FIGS. 28, 29 and 30. The terminal 69 is connected by lead 56' to the battery test switch 56, supported on the front panel 51 and manipulated by the push button 56a. The output terminal of the switch 56 is connected to a terminal 82 mounted on the circuit board as shown in FIGS. 28, 29 and 30. The terminal 82 is connected to a resistor 83, and the resistor 83 is connected by lead 83' to the inverting input terminal 80c of the second stage operational amplifier 80, as indicated in FIG. 30. Since the battery voltage is transmitted to and processed through the second stage operational amplifier 80 and the rectifier bridge 85, a battery voltage level reading can be taken on the scale section 55a' of the meter M.

The battery voltage reading on the meter scale 55a' is taken when the on-off switch 54 is in the ON position. The battery test resistor 83, operating in combination with resistor 81, applies to the inverting input terminal 80c of the amplifier 80 a portion of the battery voltage which will result in a full scale reading on the scale section 55a' of the meter M when a new battery is used or installed. A "Good" reading on the meter scale 55a' provides the means for noting the acceptable voltage of the battery 53 during its useful life.

The positive terminal 53'' of the battery 53 is also connected through the terminal 69 to a resistor 91 and thence by lead 91' to the collector terminal 92a of NPN transistor 92, as indicated in FIGS. 28, 29 and 30. The emitter terminal 92b of the transistor 92 is connected by lead 92' to the terminal jack 33a'' supported on the circuit board 52. The binding post 33a'' is connected by a lead 92'' to the positive power input prong 33a' of the recessed receptacle 48, and prong 33a' is connected by leads to the positive power input terminals 33 of probe A and B as heretofore described.

The emitter terminal 92b of the transistor 92 is also connected by lead 80e' to the positive power input terminal 80e of the second stage operational amplifier 80 as indicated in FIG. 30. A lead 70e' is connected from lead 80e' to the positive power input terminal 70e of the first stage operational amplifier 70. Negative and positive power is thus supplied to the first stage and second stage operational amplifiers 70 and 80 of the measuring set C, as well as the operational amplifier 25 of the probe circuits 20 contained in the probe heads 1 of probes A and B; all under the control of the on-off battery switch 54.

A constant voltage supply to the battery driven operational amplifiers 25 of probes A and B, and to the battery driven operational amplifiers 70 and 80 of the measuring set C, is assured by providing a voltage regulator circuit. This voltage regulator circuit includes a resistor 93 connected by lead 93' to the collector terminal 92a of the transistor 92 and by lead 93" to the base terminal 92c of the transistor 92, and a zener diode 94 connected by leads 94' and 94" between the base terminal 92c of the transistor 92 and the negative power lead 54' from the battery. Resistor 93 thus provides current for zener diode 94, and zener diode 94 then regulates the voltage at the base terminal 92c of transistor 92. Transistor 92 operates as an emitter follower so that the voltage at its emitter terminal 92b follows the regulated voltage at its base terminal 92c. This combination provides a voltage regulator circuit which assures a constant voltage supply to the operational amplifiers 25 of the probes A and B, and the operating amplifiers 70 and 80 of the measuring set C over the useful life of the battery, and which further prevents changes in calibration and improves the overall performance of the measuring set meter M.

A pair of dividing resistors 95 and 96 are connected by leads 95' and 96' to the positive power output lead 92''' and the negative power output lead 54' from the voltage regulator as indicated in FIG. 30. The resistors 95 and 96 are connected together by leads 95" and 96" which are in turn joined by a common lead 58" to the terminal post 58 which is connected by lead 59' to the common grounding post 59. The resistors 95 and 96 establish a voltage level midway between positive and negative output voltages from the regulator. The post 58 is connected to the common grounding prong 37a' so as to provide equal positive and negative voltages to the positive and negative power input prongs 33a' and 31a' which are connected to the power input terminals 33 and 31 of probes A and B.

A pair of filter capacitors 97 and 98 are also connected by leads 97' and 98' to the positive power output lead 92' and the negative power output lead 54' from the regulator. The filter capacitors 97 and 98 are joined together by leads 97" and 98", and then connected to the common lead 58" leading to the terminal post 58, and grounded by lead 59' to the common grounding post 59. The filter capacitors 97 and 98 operate to filter out unwanted signals from the positive and negative power input terminals 33 and 31 of probes A and B, and from the power input terminals of operational amplifiers 70 and 80 on circuit board 52.

In the power circuit arrangement shown in FIG. 30 and above described, the positive power input terminal 33 and the negative power input terminal 31, of the probes A and B, receive equal negative and positive power voltages from the battery 53 by reason of the resistors 95 and 96, and all unwanted signals are filtered out from the positive and negative power input terminals 33 and 31 of probes A and B, by the filter capacitors 97 and 98.

It is desirable to provide convenient means for listening to the signals picked up by the probes to determine the nature of the noise or signals on the cable shield. This means may comprise a head phone jack 77 as shown in FIG. 30, having a terminal 77' which is grounded by the common grounding lead 58'. The other terminal 77" of the head phone jack 77 is connected through a resistor 78 to the output terminal 70b of the first stage operational amplifier 70. The head phone set jack 77 delivers an audible signal to a phone plugged into the jack.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method of evaluating the acceptable shielding integrity of the shield connection in a splice joining the adjacent ends of two insulated and shielded communication cable sections installed in the field, without damage to the insulation, which includes;

capacitively coupling a pair of spaced probes, equally sensitive to undesired noise signals induced on the cable shield and shield connection, across the questioned splice and adjacent to the input and output ends thereof;

processing the noise signal picked up by each of said probes with reference to ground through a unity gain ultra-high impedance converting circuit into a low impedance output voltage;

measuring the low impedance output voltage from each of said probes with respect to a common ground;

any by comparing the differences between the output signal voltages from said spaced probes with respect to ground with a known standard, determining whether the installed splice meets required shielding standards, or may require repair.

2. A method of evaluating the acceptable shielding integrity of the shield connection in a splice joining the adjacent ends of two insulated and shielded communication cable sections installed in the field, without damage to the insulation, which includes;

capacitively coupling a pair of spaced probes, equally sensitive to undesired noise signals induced on the cable shield and shield connection, across the questioned splice and adjacent to the input and output ends thereof;

processing the noise signal picked up by each of said probes through a unity gain ultra-high impedance converting circuit to obtain a low impedance output voltage;

measuring the low impedance output voltage differential between said spaced probes;

and by comparing the measured voltage differential existing between said spaced probes with the known optimum voltage differential for a quality splice, determining whether the installed splice meets required shielding standards, or may require repair.

3. A method of evaluating the acceptable shielding integrity of the shield connection in a splice joining the adjacent ends of two insulated and shielded communication cable sections installed in the field, without damage to the insulation, which includes;
   capacitively coupling a pair of spaced probes, equally sensitive to undesired noise signals induced on the cable shield and shield connection, across the questioned splice and adjacent to the input and output ends thereof;
   processing the noise signal picked up by each of said probes through a unity gain ultra-high impedance converting circuit to obtain a low impedance output voltage;
   measuring for reference use the low impedance output voltage between ground and one of said probes;
   measuring the low impedance output voltage differential between said spaced probes;
   and by comparing the measured voltage differential between said spaced probes, with the measured voltage between ground and one of said probes used as a reference, determining whether the installed splice meets required shielding standards, or may require repair.

4. The method of evaluating the acceptable shielding integrity of the shield connection in a splice joining the adjacent ends of two insulated and shielded communication cable sections as defined in claim 3, which includes the further step of measuring for reference use the low impedance output voltage between a common ground and each of said probes, and by comparing the measured voltage differential between said probes. with the measured voltage between the common ground and each of said probes used as a reference, determining whether the installed splice meets required shielding standards, or may require repair.

5. A method of evaluating the shielding integrity of the shield connection in a splice joining the adjacent ends of insulated and shielded communication cable sections installed in the field, without damage to the insulation, which includes;
   initially capacitively coupling a pair of spaced probes, equally highly sensitive to undesired noise signals induced on the cable shield and shield connection, to an intact portion of said communication cable which is adjacent to the input end of said splice;
   measuring for reference use the voltage differential induced on the cable shield and picked up by said spaced probes as initially coupled;
   as a second step, capacitively coupling said spaced probes to the cable sections across the questioned splice and adjacent to the input and output ends of the splice;
   measuring the voltage differential induced on the splicing shield and picked up by said spaced probes as secondarily coupled;
   and evaluating the condition and quality of the questioned shield connection by comparing the measured voltage differential taken during said first coupling step, with the measured voltage differential taken during said second coupling step.

6. A method of evaluating the shielding integrity of the shield connection in a splice joining the adjacent ends of insulated and shielded communication cable sections installed in the field, without damage to the insulation, which includes;
   initially capacitively coupling a pair of spaced probes, equally highly sensitive to undersized noise signals induced on the cable shield and shield connection, to an intact portion of said communication cable which is adjacent to the input end of said splice;
   measuring for initial reference use the voltage differential induced on the cable shield and picked up by said spaced probes as initially coupled;
   as a second step, capacitively coupling said spaced probes to the cable sections across the questioned splice and adjacent to the input and output ends of the splice;
   during said second coupling step, measuring for secondary reference use the voltage induced on the cable shields and picked up by each of said probes with respect to a common ground;
   during said second coupling step, measuring the voltage differential induced on the splicing shield and picked up by said spaced probes;
   and evaluating the condition and quality of the questioned shield connection by comparing the measured voltage differential between said spaced probes and taken during said second coupling step, with (a) the reference voltage measurement made between each of said probes with respect to the common ground taken during said second coupling step, and also with (b) the measured voltage differential between said spaced probes and taken as a reference during said first coupling step.

7. A method of evaluating the shielding integrity of the shield connection in a splice joining the ends of two insulated and shielded communication cable sections as defined in claim 6, which includes the further step of minimizing the effect of variable coupling through the cable insulation by processing the noise signal picked up by each of said probes during the first and second coupling steps through a unity gain ultra-high impedance converting circuit to obtain a low impedance output voltage subject to measurement and comparison.

8. A method of evaluating the shielding integrity and grounding of the shield connection in a splice joining the adjacent ends of two insulated and shielded communication cable sections installed in the field, without damage to the insulation, which includes;
   initially capacitively coupling a pair of spaced probes, equally highly sensitive to undesired noise signals induced on the cable shield and shield connection, to an intact portion of that communication cable section which is adjacent to the input end of said splice;
   as a second coupling step, capacitively coupling said spaced probes to the cable sections across the questioned splice and adjacent to the input and output ends of the splice;

processing the noise signal picked up by each of said probes, during said initial coupling step and second coupling step, through a unity gain ultra-high impedance converting circuit to obtain a low impedance output voltage adapted for voltage measurement;

during said initial coupling step, measuring for a first reference use, the voltage differential between the low impedance voltage outputs from said spaced probes, after processing through said noise signal converting circuits; during said initial coupling step, measuring for a second reference use, the low impedance voltage output from each of said spaced probes, after processing through said noise signal converting circuits, with respect to a common ground;

during said second coupling step, measuring the voltage differential between the low impedance voltage outputs from said spaced probes, after processing through said noise signal converting circuits;

and evaluating the condition and quality of the questioned shield connection and shield grounding by comparing the measured voltage differential between said spaced probes taken during said second coupling step, with (a) the measured voltage differential between said spaced probes taken as a first reference during said first coupling step, and also (b) with the measured voltages between each of said probes and the common ground taken as a second reference during said first coupling step.

9. A method of evaluating the shielding integrity and grounding of the shield connection in a splice joining the adjacent ends of two insulated and shielded communication cable sections installed in the field, without damage to the insulation, which includes;

initially capacitively coupling a pair of spaced probes, equally highly sensitive to undesired noise signals induced on the cable shield and shield connection, to an intact portion of that communication cable section which is adjacent to the input end of said splice;

as a second coupling step, capacitively coupling said spaced probes to the cable sections across the questioned splice and adjacent to the input and output ends of the splice;

processing the noise signal picked up by each of said probes, during said initial coupling step and second coupling step, through a unity gain ultra-high impedance converting circuit to obtain a low impedance output voltage adapted for voltage measurement;

during said initial coupling step, measuring for a first reference use, the voltage differential between the low impedance voltage outputs from said spaced probes, after processing through said noise signal converting circuits;

during said initial coupling step, measuring for a second reference use, the low impedance voltage output from each of said spaced probes, after processing through said noise signal converting circuits, with respect to a common ground;

during said second coupling step, and after processing through said noise signal converting circuits, measuring the voltage differential between the low impedance voltage outputs from said spaced probes, and also measuring the voltage outputs between each of said probes and the common ground;

and evaluating the condition and quality of the questioned shield connection and shield grounding by comparing the measured voltage differential between said spaced probes, and the measured voltage outputs between each of said probes with respect to the common ground as taken during said second coupling step; with (a) the measured voltage differential between said spaced probes taken as a first reference during said first coupling step, and also (b) with the measured voltages between each of said probes and the common ground taken as a second reference during said first coupling step.

10. An apparatus system for evaluating the shielding integrity and grounding of a questioned section of a shielded and insulated communication cable, which includes;

a pair of probe heads, equally sensitive to undesired noise signals induced on the cable shield, and designed to be applied in spaced relation to the cable across the questioned section thereof, each of said probe heads embracing a noise signal pickup electrode designed to be capacitively coupled to the communication cable adjacent an end of the questioned section thereof to be evaluated;

a shielding electrode insulated from said pickup electrode;

and a unity gain high impedance converting circuit operative to translate the noise signals received by the pickup electrode into a low impedance output voltage adapted for voltage measurement, said converting circuit embracing an operational amplifier of voltage follower configuration having a non-inverting input terminal connected to said pickup electrode and an output terminal respectively connected to the inverting input terminal of said amplifier and to said shielding electrode and through a capacitor to the junction of a series pair of resistors connected between the pickup electrode and ground;

and a voltage measuring instrument which includes a voltmeter connected in circuit through a rectifier bridge, operational amplifier and a transformer to the output terminals extending from the converting circuits in said probe heads.

11. Apparatus as defined in claim 10 whose voltage measuring instrument further includes a switchable attenuator in circuit with said transformer and operational amplifier for use in adjusting and calibrating said voltmeter.

12. An apparatus system for evaluating the shielding integrity and grounding of a questioned section of a shielded and insulated communication cable, which includes;

a pair of probe heads, equally sensitive to undesired noise signals induced on the cable shield, and designed to be applied in spaced relation to the cable across the questioned section thereof, each of said probe heads embracing a noise signal pickup electrode designed to be capacitively coupled to the communication cable adjacent an end of the questioned section thereof to be evaluated;

a shielding electrode insulated from said pick-up electrode;

and a unity gain high impedance converting circuit operative to translate the noise signals received by the pickup electrode into a low impedance output voltage adapted for voltage measurement;

and a voltage measuring instrument which embraces a three way switch presenting a pair of flexible contacts which normally connect the low impedance signal voltage output terminals of the converting circuits in said paired probe heads respectively through a pair of capacitors to the primary winding of a transformer, said three way switch having selective means for manipulating said flexible contacts into circuit with the signal voltage output terminal from one of said probes and ground, and for manipulating the said flexible contacts into circuit with the signal output voltage terminal from the other probe and ground, said transformer having the secondary winding thereof connected to the noninverting input terminal of a first stage operational amplifier and the output terminal of said first stage amplifier being connected to the inverting input terminal thereof and also to the noninverting input terminal of a second stage operational amplifier, the output terminal of said second stage amplifier being connected to the first input terminal of a rectifier bridge, the second input terminal of said rectifier bridge being connected to the inverting input of said second stage operational amplifier, a measuring meter having positive and negative power input terminals connected to the output terminals of said rectifier bridge, and a source of negative and positive direct current connected to and supplying operating power to said high impedance circuits associated with said probe heads and said first and second stage operational amplifiers of said measuring circuit.

13. An apparatus system for evaluating the shielding integrity and grounding of a questioned section of a shielded and insulated communication cable, which includes;

a pair of probe heads, equally sensitive to undesired noise signals induced on the cable shield, and designed to be applied in spaced relation to the cable across the questioned section thereof, each of said probe heads embracing a noise signal pickup electrode designed to be capacitively coupled to the communication cable adjacent an end of the questioned section thereof to be evaluated;

a shielding electrode insulated from said pickup electrode and a unity gain high impedance converting circuit operative to translate the noise signals received by the pickup electrode into a low impedance output voltage adapted for voltage measurement;

and a measuring and calibrating instrument which includes a measuring circuit connected to the output terminals extending from the converting circuits in said probe heads, said measuring circuit embracing a voltage measuring meter presenting a decibel scale and an indicator manipulated by circuitry connecting the signal output terminals of said paired probe heads to said indicator, said circuitry embracing a transformer, an attenuator for calibrating said voltage measuring meter having adjustable means for connecting a selected attenuator terminal to the noninverting input terminal of a first stage operational amplifier, said first stage amplifier having an output terminal connected through a capacitor to the noninverting input terminal of a second stage operational amplifier, the output terminal of said second stage amplifier being connected to the first input terminal of a rectifier bridge, the second input terminal of said rectifier bridge being connected to the inverting input terminal of said second stage operational amplifier and also through a resistor to a common ground terminal, the output terminals of said rectifier bridge being connected to the input terminals of said measuring meter, and a direct current battery having positive and negative power output terminals connected to the power input terminals of the first stage and second stage operational amplifiers of said measuring circuitry, said positive and negative battery output terminals being also connected to the power input terminals of the operational amplifier of both probe head converting circuits.

14. An apparatus system as defined in claim 13 and whose measuring circuit further includes, means for testing the current output efficiency of said direct current battery and which embraces a battery scale on the measuring meter whose indicator is connected to the input terminals of said rectifier bridge, and a battery test switch connected to the positive side of said battery and through a resistor to the inverting input terminal of said second stage operational amplifier.

15. An apparatus system for evaluating the shielding integrity and grounding of a questioned section of a shielded and insulated communication cable, which includes;

a pair of probe heads, equally sensitive to undesired noise signals induced on the cable shield, and designed to be applied in spaced relation to the cable across the questioned section thereof, each of said probe heads embracing a noise signal pickup electrode designed to be capacitively coupled to the communication cable adjacent an end of the questioned section thereof to be evaluated;

a shielding electrode insulated from said pickup electrode;

and a unity gain high impedance converting circuit operative to translate the noise signals received by the pickup electrode into a low impedance output voltage adapted for voltage measurement, said converting circuit embracing an operational amplifier of voltage follower configuration having a noninverting input terminal connected to said pickup electrode and an output terminal respectively connected to the inverting input terminal of said amplifier and to said shielding electrode and through a capacitor to the junction of a series pair of resistors connected between the pickup electrode and ground; and an instrument which includes a measuring circuit connected to the output terminals extending from the converting circuits in said probe heads, said measuring circuit embracing a measuring meter presenting a decibel scale and an indicator manipulated by circuitry connecting the signal output terminals of said paired probe heads to said indicator, said circuitry embracing a transformer, an attenuator, adjustable means for connecting a selected attenuator terminal to the noninverting input terminal of a first stage operational amplifier, said first stage amplifier having an output terminal connected through a capacitor to the noninverting input terminal of a second stage operational amplifier, the output terminal of said second stage amplifier being connected to the first input terminal of a rectifier bridge, the second input terminal of said rectifier bridge being connected to the inverting input terminal of said second stage operational amplifier and also through a resistor to a common ground terminal, the output terminals of said rectifier bridge being connected to the input terminals of said measuring meter, and a direct current battery having positive and negative power output terminals connected to the power input terminals of the first stage and second stage operational amplifiers of said measuring circuitry, said positive and negative battery output terminals being also connected to the power input terminals of the operational amplifiers of both probe head converting circuits.

16. An apparatus system for evaluating the shielding integrity and grounding of a questioned section of a shielded and insulated communication cable, which includes;
   a pair of probe heads, equally sensitive to undesired noise signals induced on the cable shield, and designed to be applied in spaced relation to the cable across the questioned section thereof, each of said probe heads embracing
      a noise signal pickup electrode designed to be capacitively coupled to the communication cable adjacent an end of the questioned section thereof to be evaluated;
      a shielding electrode insulated from said pickup electrode;
      and a unity gain high impedance converting circuit operative to translate the noise signals received by the pickup electrode into a low impedance output voltage adapted for voltage measurement, said converting circuit embracing an operational amplifier of voltage follower configuration having a noninverting input terminal connected to said pickup electrode and an output terminal respectively connected to the inverting input terminal of said amplifier and to said shielding electrode and through a capacitor to the junction of a series pair of resistors connected between the pickup electrode and ground;
      and an instrument which includes a measuring circuit connected to the output terminals extending from the converting circuits in said probe heads, said measuring circuit embracing a transformer, an attenuator, an operational amplifier, a voltage measuring meter and a source of positive and negative direct current power connected to the operational amplifier in said probe heads and said measuring instrument.
   a pair of probe heads, equally sensitive to undesired noise signals induced on the cable shield, and designed to beapplied in spaced relation to thecableacross the questioned section thereof, each of said probe heads embracing
      a noise signal pickup electrode designed to be capacitively coupled to the communication cable adjacent an end of thequestioned section thereof to be evaluated;
      a shielding electrode insulated from saidpickup electrode;

* * * * *